(12) United States Patent
Kimoto et al.

(10) Patent No.: US 10,615,667 B2
(45) Date of Patent: Apr. 7, 2020

(54) ROTARY ELECTRIC MACHINE

(71) Applicant: MITSUBISHI ELECTRIC CORPORATION, Chiyoda-ku (JP)

(72) Inventors: Yusuke Kimoto, Chiyoda-ku (JP); Yoshiaki Kitta, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/342,703

(22) PCT Filed: Apr. 27, 2017

(86) PCT No.: PCT/JP2017/016798
§ 371 (c)(1),
(2) Date: Apr. 17, 2019

(87) PCT Pub. No.: WO2018/105143
PCT Pub. Date: Jun. 14, 2018

(65) Prior Publication Data
US 2019/0296611 A1 Sep. 26, 2019

(30) Foreign Application Priority Data
Dec. 5, 2016 (JP) .................. 2016-235797

(51) Int. Cl.
*H02K 9/19* (2006.01)
*H02K 3/34* (2006.01)
(Continued)

(52) U.S. Cl.
CPC ............. *H02K 9/19* (2013.01); *H02K 3/34* (2013.01); *H02K 3/522* (2013.01); *H02K 5/20* (2013.01); *H02K 5/225* (2013.01)

(58) Field of Classification Search
CPC ............ H02K 3/32; H02K 3/325; H02K 3/34; H02K 3/345; H02K 9/19; H02K 9/193;
(Continued)

(56) References Cited

U.S. PATENT DOCUMENTS

| 6,087,744 A | 7/2000 | Glauning |
| 2013/0115064 A1* | 5/2013 | Kimura ............. H02K 3/522 |
| | | 415/177 |

(Continued)

FOREIGN PATENT DOCUMENTS

| JP | 2003-125548 A | 4/2003 |
| JP | 2009-171755 A | 7/2009 |

(Continued)

OTHER PUBLICATIONS

Nagai, Machine Translation of JP2016127681, Jul. 2016 (Year: 2016).*

(Continued)

*Primary Examiner* — Quyen P Leung
*Assistant Examiner* — Eric Johnson
(74) *Attorney, Agent, or Firm* — Oblon, McClelland, Maier & Neustadt, L.L.P.

(57) ABSTRACT

Provided is a rotary electric machine in which cooling efficiency can be improved. The rotary electric machine includes a first refrigerant passage through which refrigerant passes from the shaft to the rotor core, wherein the rotor core includes a second refrigerant passage through which the refrigerant having passed through the first refrigerant passage passes, wherein the insulator includes: a base portion; a radially inner protruding portion, which is formed on a radially inner side of the base portion, and a radially outer protruding portion, which is formed on a radially outer side of the base portion, wherein the radially inner protruding portion has a first through-hole penetrating therethrough in a radial direction, and wherein the refrigerant having passed through the second refrigerant passage passes through the first through-hole to travel to the stator coil end portion.

12 Claims, 25 Drawing Sheets

(51) Int. Cl.
*H02K 3/52* (2006.01)
*H02K 5/20* (2006.01)
*H02K 5/22* (2006.01)

(58) Field of Classification Search
CPC .......... H02K 9/197; H02K 9/20; H02K 3/38; H02K 3/522; H02K 5/20; H02K 5/225
USPC .... 310/54, 58, 59, 60 A, 60 R, 61, 214, 215
See application file for complete search history.

(56) References Cited

U.S. PATENT DOCUMENTS

| | | | | |
|---|---|---|---|---|
| 2013/0313928 | A1* | 11/2013 | McKinzie | H02K 1/32 310/54 |
| 2014/0015354 | A1* | 1/2014 | Satou | H02K 9/19 310/58 |
| 2016/0241093 | A1* | 8/2016 | Patel | H02K 3/24 |

FOREIGN PATENT DOCUMENTS

| | | | |
|---|---|---|---|
| JP | 2009-296772 | A | 12/2009 |
| JP | 2010-028979 | A | 2/2010 |
| JP | 2010-051130 | A | 3/2010 |
| JP | 2010-246268 | A | 10/2010 |
| JP | 2011-101461 | A | 5/2011 |
| JP | 2013-9508 | A | 1/2013 |
| JP | 2014-23297 | A | 2/2014 |
| JP | 2015-012792 | A | 1/2015 |
| JP | 2016127681 | A * | 7/2016 |

OTHER PUBLICATIONS

International Search Report dated Jun. 20, 2017 in PCT/JP2017/016798 filed on Apr. 27, 2017.
Written Opinion issued in PCT/JP2017/016798 dated Jun. 20, 2019, (English translation).

* cited by examiner

GRAVITY DIRECTION

GRAVITY DIRECTION

204

205

206

ROTARY ELECTRIC MACHINE

TECHNICAL FIELD

The present invention relates to a rotary electric machine in which a stator core and a stator coil are cooled.

BACKGROUND ART

A rotary electric machine includes a stator and a rotor. The stator includes a stator coil and a stator core. The rotor is provided on a radially inner side from the stator. When the rotor is rotated, a drive force for rotation is given to, for example, a transaxle or a transmission. There is arranged insulating paper made of paper and an insulator made of a resin, which are insulating members configured to contribute to insulation for blocking an electric current, between the stator coil, and a side surface portion of the stator core and an axial end portion of the stator core. When the rotary electric machine is driven, heat is generated due to a copper loss that occurs in the stator coil made of copper and an iron loss that occurs in the stator core made of a magnetic material. When cooling of the stator coil and the stator core is not sufficiently performed, it becomes difficult to drive the rotary electric machine.

As a technology of cooling the rotary electric machine through use of refrigerant, there has hitherto been known a rotary electric machine in which a refrigerant passage through which refrigerant passes is formed in a shaft, the shaft has jetting holes for causing the refrigerant having passed through the refrigerant passage to fly to a radially outer side when the shaft is rotated, and the refrigerant having flown from the jetting holes collide with a corner portion of a stator coil end portion (see, for example, Patent Literature 1).

CITATION LIST

Patent Literature

[PTL 1] JP 2013-9508 A

SUMMARY OF INVENTION

Technical Problem

However, the refrigerant collides with the corner portion of the stator coil end portion and is repelled therefrom. Therefore, the refrigerant cannot be held on the stator coil end portion, with the result that there is a problem in that cooling efficiency is unsatisfactory.

The present invention provides a rotary electric machine in which cooling efficiency can be improved.

Solution to Problem

According to one embodiment of the present invention, there is provided a rotary electric machine, including: a rotor including a shaft and a rotor core provided on the shaft; and a stator including a stator core provided on a radially outer side from the rotor, an insulator provided on an axially outer side from the stator core, and a stator coil end portion formed on the insulator, the rotor being configured to rotate about the shaft, the rotary electric machine comprising a first refrigerant passage through which refrigerant passes from the shaft to the rotor core, wherein the rotor includes a second refrigerant passage through which the refrigerant having passed through the first refrigerant passage passes, wherein the insulator includes: a base portion opposed to an axial end portion of the stator core; a radially inner protruding portion, which is formed on a radially inner side of the base portion, and extends from the base portion in a direction of separating from the stator core in an axial direction; and a radially outer protruding portion, which is formed on a radially outer side of the base portion, and extends from the base portion in the direction of separating from the stator core in the axial direction, wherein the radially inner protruding portion has a first through-hole penetrating therethrough in a radial direction, and wherein the refrigerant having passed through the second refrigerant passage passes through the first through-hole to travel to the stator coil end portion.

Advantageous Effects of Invention

In the rotary electric machine according to an embodiment of the present invention, the refrigerant having passed through the second refrigerant passage of the rotor passes through the first through-hole of the insulator to travel to the stator coil end portion, and hence the refrigerant is held on the stator coil end portion. As a result, cooling efficiency can be improved.

DESCRIPTION OF EMBODIMENTS

Now, each embodiment of the present invention is described with reference to the drawings. Each embodiment described below is an example, and the present invention is not limited to those embodiments.

First Embodiment

Figure 1:
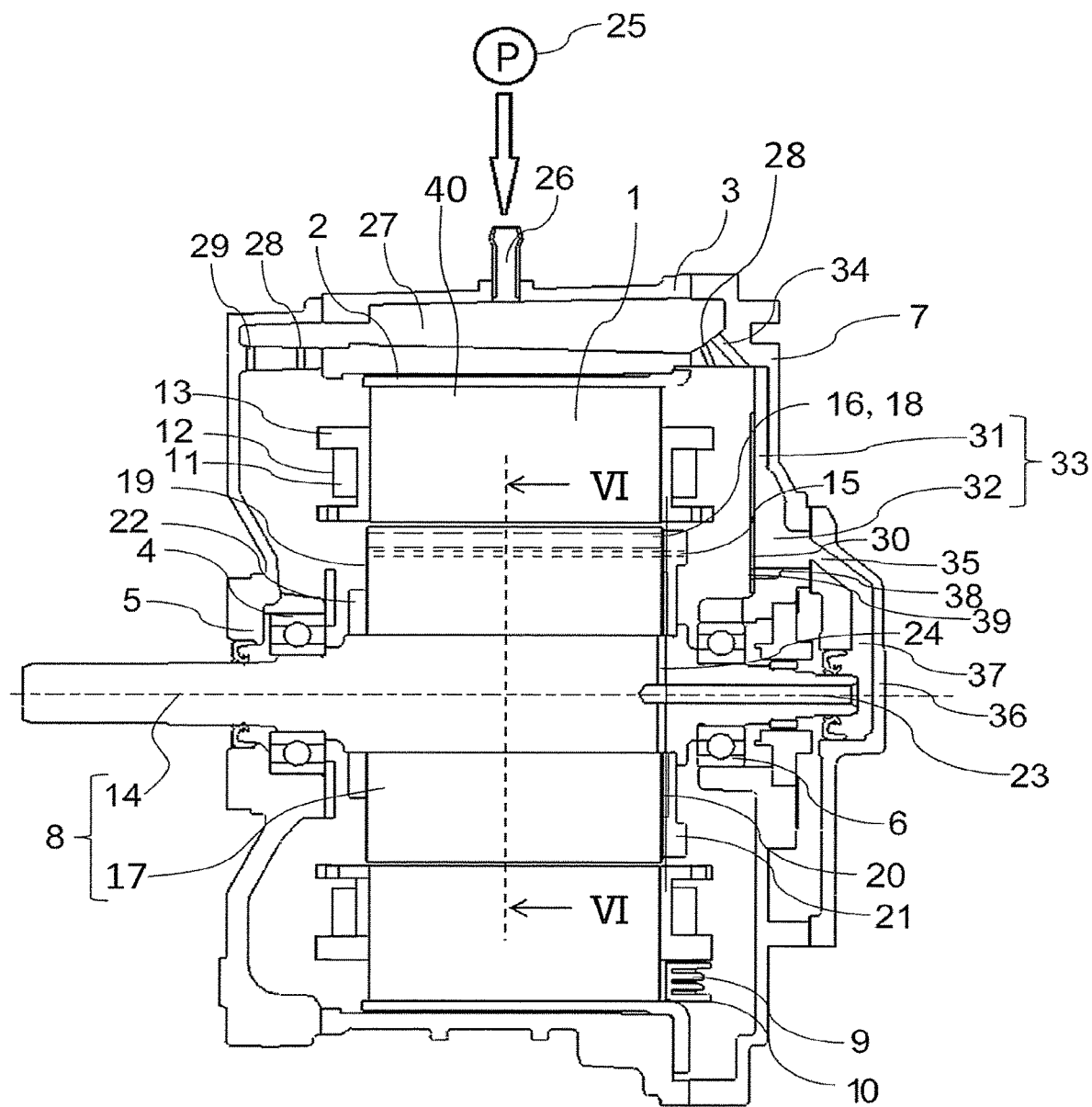
FIG. 1 is a sectional view for illustrating a rotary electric machine according to a first embodiment of the present invention.

FIG. 1 is a sectional view for illustrating a rotary electric machine according to a first embodiment of the present invention. The rotary electric machine includes a stator 40 and a rotor 8. The stator 40 includes a stator core 1 and a stator coil 11 provided on the stator core 1. When an electric current flows through the stator coil 11, a rotation magnetic field is generated, and an induced current flows through the rotor 8. The rotor 8 is rotated with an electromagnetic force caused by the induced current. When the rotor 8 is rotated, motive power is generated. That is, the rotary electric machine functions as an electric motor. Meanwhile, when the rotor 8 is rotated with an external force, operations opposite to the above-mentioned series of operations occur, and the rotary electric machine functions as a power generator.

The stator core 1 is fixed by being fitted into a tubular frame 2. The frame 2 is made of iron. The frame 2 is fixed to a center frame 3. The center frame is made of aluminum.

A load-side bearing 4 is held by a front frame 5. A non-load-side bearing 6 is held by a rear frame 7. The rotor 8 is rotatably supported by the load-side bearing 4 and the non-load-side bearing 6. The front frame 5 and the rear frame 7 are fixed to the center frame 3. In this example, a load side refers to a front side in the rotary electric machine, and a non-load side refers to a rear side in the rotary electric machine.

A bus bar 9 configured to feed power to each of UVW phases and a bus bar holder 10 configured to accommodate the bus bar 9 are arranged on an end surface of the stator core 1 on the non-load side. Insulators 13 are arranged in axial both end portions and side surface portions of the stator core 1. Further, insulating paper (not shown) is arranged in the axial both end portions and the side surface portions of the stator core 1. The insulator 13 is made of a resin. Further, the insulator 13 is configured to contribute to insulation for blocking an electric current. In this example, an axial direction refers to a direction in which a center line about which the rotor 8 is rotated extends.

The stator coil 11 is provided to the stator core 1 through intermediation of the insulators 13 and the insulating paper (not shown). A portion of the stator coil 11, which is formed on an axially outer side from the stator coil 1, is defined as a stator coil end portion 12. The stator coil 11 is formed, for example, by winding a wire material having high electric conductivity, for example, copper as typified by a concentrated winding.

Figure 2:
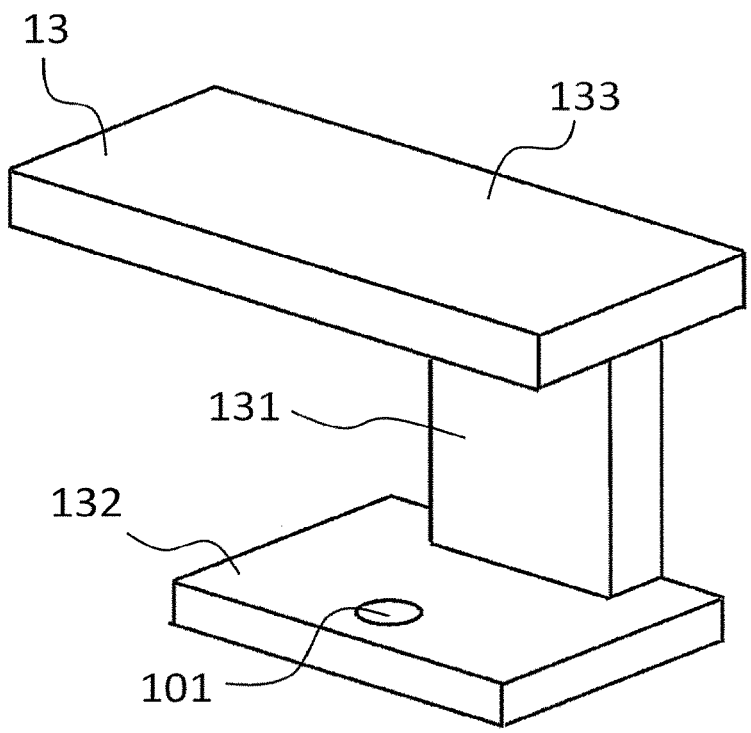
FIG. 2 is a perspective view for illustrating an insulator of FIG. 1.
Figure 3:
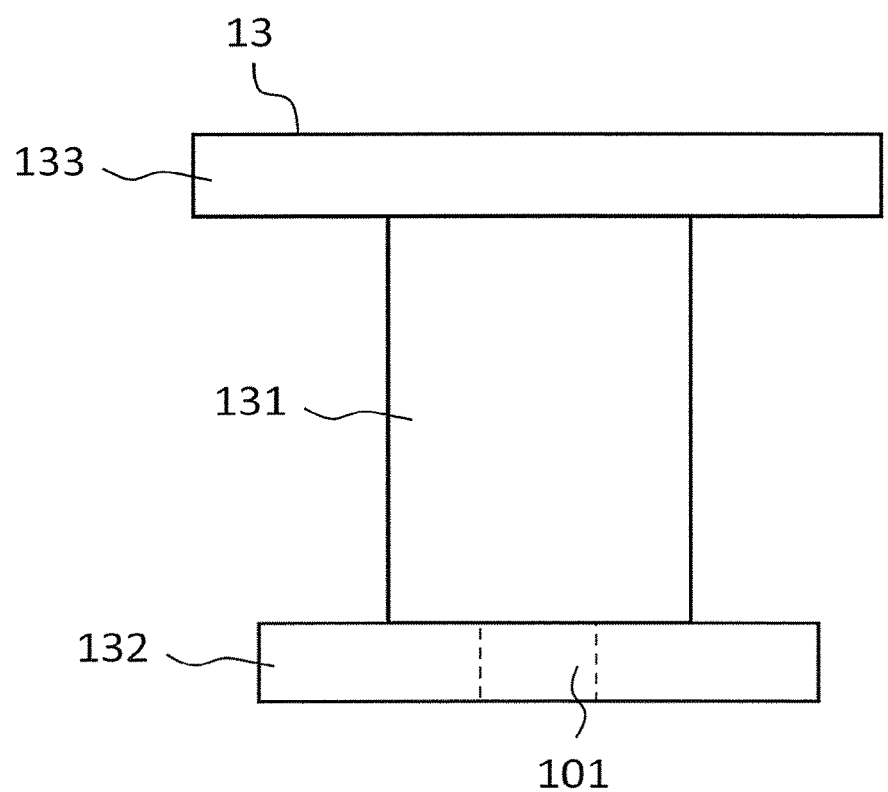
FIG. 3 is a front view for illustrating the insulator of FIG. 2.
Figure 4:
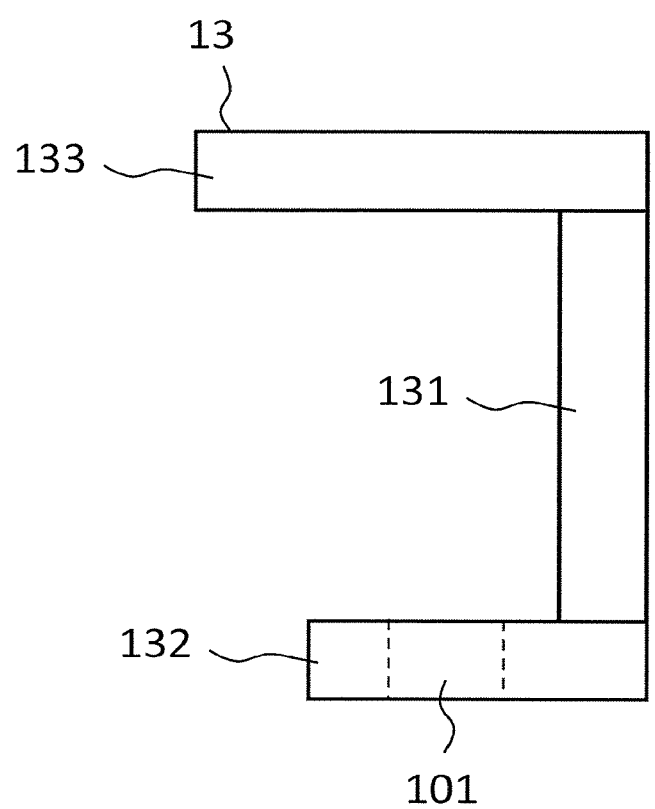
FIG. 4 is a side view for illustrating the insulator of FIG. 2.

FIG. 2 is a perspective view for illustrating the insulator 13 of FIG. 1. FIG. 3 is a front view for illustrating the insulator 13 of FIG. 2. FIG. 4 is a side view for illustrating the insulator 13 of FIG. 2. The insulator 13 arranged in the axial end portion of the stator core 1 is formed so as to have a U-shape in cross section in order to facilitate management of the number of turns of the wire material and positioning of the wire material. The insulator 13 includes a base portion 131, a radially inner protruding portion 132, and a radially outer protruding portion 133. The base portion 131 is opposed to the axial end portion of the stator core 1 in the axial direction. The radially inner protruding portion 132 is formed on a radially inner side of the base portion 131 and extends from the base portion 131 in a direction of separating from the stator core 1 in the axial direction. The radially outer protruding portion 133 is formed on a radially outer side of the base portion 131 and extends from the base portion 131 in the direction of separating from the stator core 1 in the axial direction. In this example, a radial direction refers to a radial direction with the center line about which the rotor 8 is rotated being the center. In the insulator 13 formed so as to have a U-shape in cross section, the dimension in the axial direction of the radially outer protruding portion 133 is larger than that of the radially inner protruding portion 132. In other words, the radially outer protruding portion 133 extends from the base portion 131 longer than the radially inner protruding portion 132.

As illustrated in FIG. 1, the rotor 8 includes a shaft 14, a rotor core 17, and a plurality of permanent magnets 18. The shaft 14 is rotatably supported by the load-side bearing 4 and the non-load-side bearing 6. The rotor core 17 is provided on the shaft 14 and has a plurality of through-holes 15 and a plurality of magnet accommodating holes 16, which penetrate through the rotor core 17 in the axial direction, formed at equal intervals in a circumferential direction. The plurality of permanent magnets 18 are inserted into the magnet accommodating holes 16, respectively.

Further, the rotor 8 includes a load-side end plate 19, a non-load-side end plate 20, an oil path plate 21, and a ring 22. The load-side end plate 19 is formed so as to have an outer diameter dimension equal to or less than that of the rotor core 17, and is configured to prevent the permanent magnets 18 from coming off from the load side of the magnet accommodating holes 16. The non-load-side end plate 20 is formed so as to have an outer diameter dimension equal to or less than that of the rotary core 17, and is configured to prevent the permanent magnets 18 from coming off the non-load side of the magnet accommodating holes 16. The oil path plate 21 is formed so as to have an outer diameter dimension equal to or less than that of the rotary core 17, and is formed on the non-load side of the stator core 1. The ring 22 is configured to fix the rotary core 17 to the shaft 14.

The shaft 14 includes a first shaft oil path 23 and a second shaft oil path 24. The first shaft oil path 23 is arranged in a non-load-side portion of the shaft 14, and extends in the axial direction. The second shaft oil path 24 extends from the first shaft oil path 23 to the radially outer side.

A gap is formed between the oil path plate 21 and the non-load-side end plate 20 in the axial direction. Oil paths extending in a radial fashion are formed of the gap between the oil path plate 21 and the non-load-side end plate 20. The second shaft oil path 24 is formed so that at least a part of the second shaft oil path 24 overlaps with the gap in the radial direction.

The non-load-side end plate 20 has through-holes (not shown) which communicate to the through-holes 15 of the rotor core 17 and at least parts of radially outer end portions in the radial oil paths formed of the gap between the non-load-side end plate 20 and the oil path plate 21.

The center frame 3 has an inlet 26 and a first oil path 27. Cooling oil 104 that is pumped from an external pump 25 is introduced into the center frame 3 through the inlet 26. The first oil path 27 is configured to cause the cooling oil 104 introduced through the inlet 26 to flow to the front frame 5 and the rear frame 7. The first oil path 27 penetrates through the center frame 3 in the axial direction.

The front frame 5 and the rear frame 7 have coil jetting holes 28 for jetting the cooling oil 104, which is refrigerant having flowed from the first oil path 27, to the stator coil end portion 12. Further, the front frame 5 has bearing jetting holes 29 for jetting the cooling oil 104 having flowed from the first oil path 27 to the load-side bearing 4.

A cover 30 is provided on an inner side of the rear frame 7. The rear frame 7 and the cover 30 form a cooling oil introducing portion 31 and a cooling oil storing portion 32. The cooling oil introducing portion 31 and the cooling oil storing portion 32 form a second oil path 33. The rear frame 7 has shaft jetting holes 34 through which the cooling oil 104 having flowed from the first oil path 27 passes. The cooling oil 104 having jetted from the coil jetting holes 28 and the shaft jetting holes 34 enters the cooling oil storing portion 32 through the cooling oil introducing portion 31.

The rear frame 7 has a through-hole 35 which penetrates the rear frame 7 in the axial direction and communicates to the cooling oil storing portion 32. Further, a rear cover 36 is provided on the rear frame 7. The rear cover 36 has a third oil path 37 that communicates to the through-hole 35. The third oil path 37 communicates to the first shaft oil path 23. The third oil path 37 is formed between the second oil path 33 and the shaft 14.

A level difference 38 is formed in a portion of the cooling oil storing portion 32 on the shaft 14 side. The level difference 38 is formed so that the dimension in the radial direction on the load side is smaller than that on the non-load side.

The cover 30 has a small hole 39. A portion of the small hole 39 on the shaft 14 side is formed on an outer side in the radial direction from the portion of the level difference 38 on the non-load side.

Figure 5:
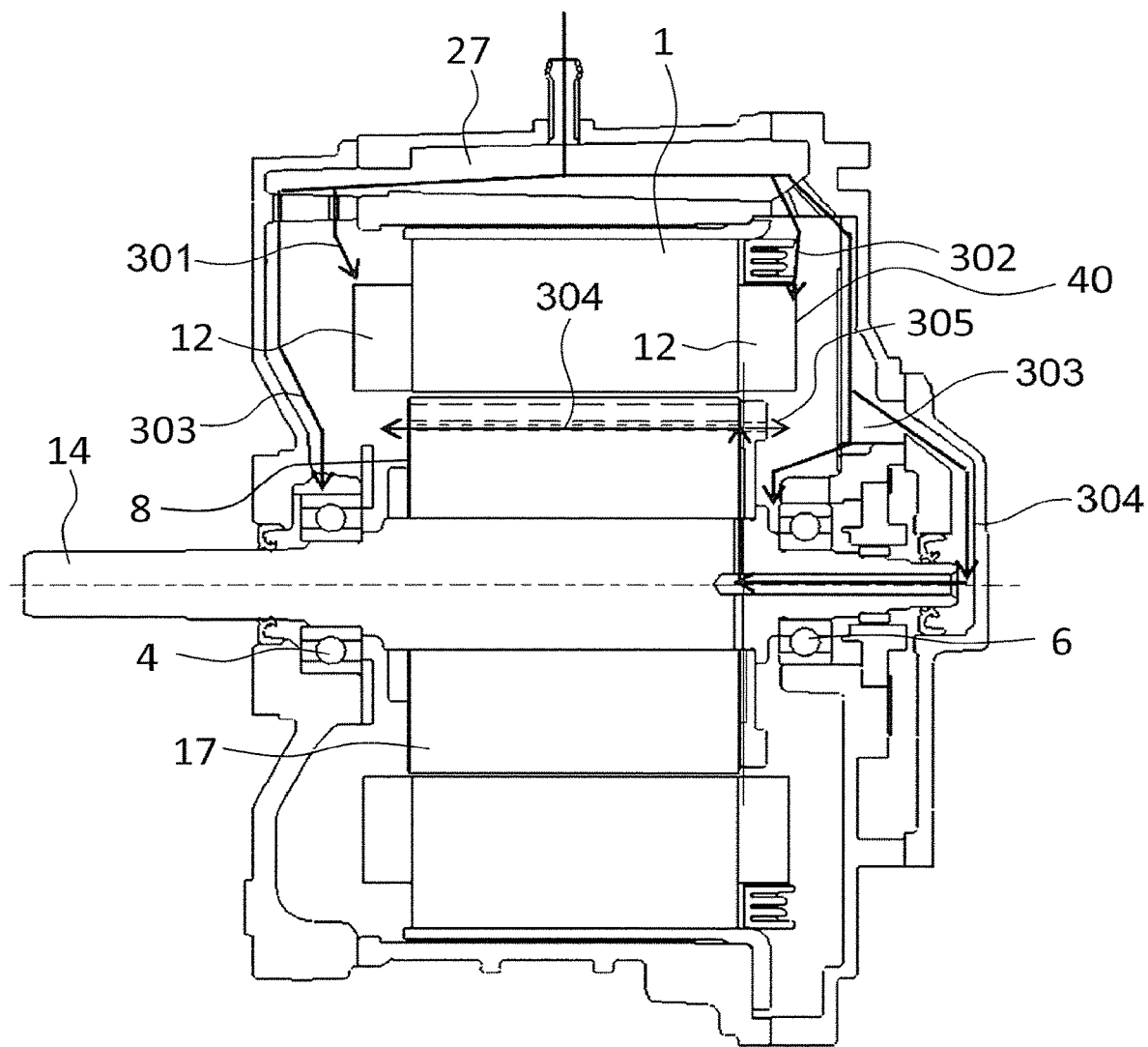
FIG. 5 is a sectional view for illustrating how cooling oil flows in the rotary electric machine of FIG. 1.
Figure 6:
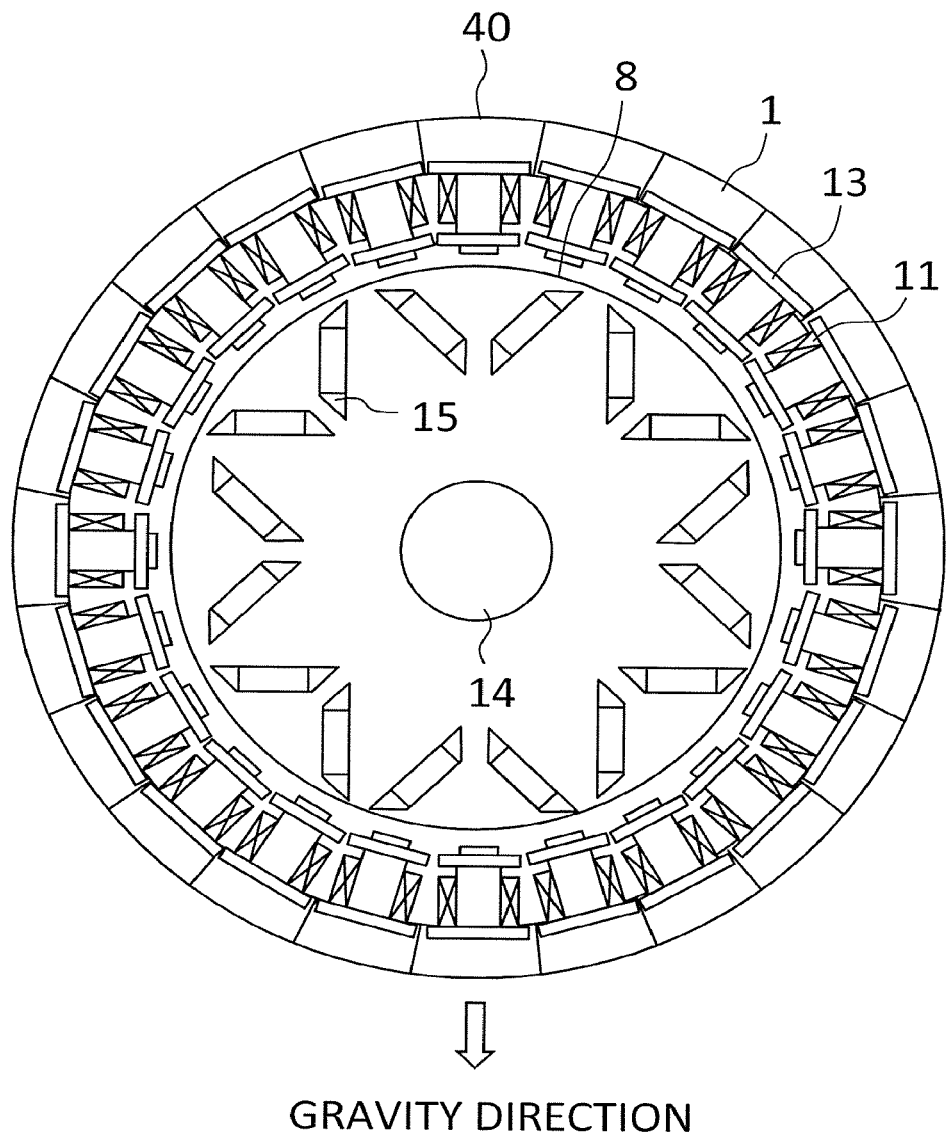
FIG. 6 is a sectional view taken along the line VI-VI of FIG. 1.

FIG. 5 is a sectional view for illustrating how the cooling oil 104 flows in the rotary electric machine of FIG. 1. FIG. 6 is a sectional view taken along the line VI-VI of FIG. 1. The rotary electric machine includes an oil path 301, an oil path 302, an oil path 303, an oil path 304, and an oil path 305. The oil path 301 is configured to cause the cooling oil 104 to flow from the first oil path 27 to the stator coil end portion 12 on the front side. The oil path 302 is configured to cause the cooling oil 104 to flow from the first oil path 27 to the stator coil end portion 12 on the rear side. The oil path 303 is configured to cause the cooling oil 104 to flow from the first oil path 27 to the load-side bearing 4 and the non-load-side bearing 6. The oil path 304 is configured to cause the cooling oil 104 to flow from the first oil path 27 to the permanent magnets 18. The oil path 305 is configured to cause the cooling oil 104 to flow from the first oil path 27 to the stator coil end portion 12 on the rear side.

The through-holes 15 that are parts of the oil path 304 are formed in portions of the magnet accommodating holes 16 on the shaft 14 side, respectively. The cooling oil 1 having passed through the oil path 304 flies to the stator coil end portion 12 on the front side and the stator coil end portion 12 on the rear side.

Meanwhile, the stator coils 11 are provided in the axial both end portions of the stator core 1 through intermediation of the insulators 13. The insulator 13 is formed so as to have a U-shape in cross section in order to facilitate the number of turns of the wire material and positioning of the wire material in the stator coil 11. Therefore, the cooling oil 104 that flies from the rotor 8 collides with the radially inner protruding portion 132 arranged on the radially inner side of the insulator 13 to prohibit cooling of the stator coil end portion 12.

A first refrigerant passage is a region in the oil path 304 through which the cooling oil 104 passes from the shaft 14 to the rotor core 17. A second refrigerant passage is a region which is formed in the rotor core 17 and through which the cooling oil 104 having passed through the first refrigerant passage in the oil path 304 passes, that is, the through-holes 15.

Figure 7:
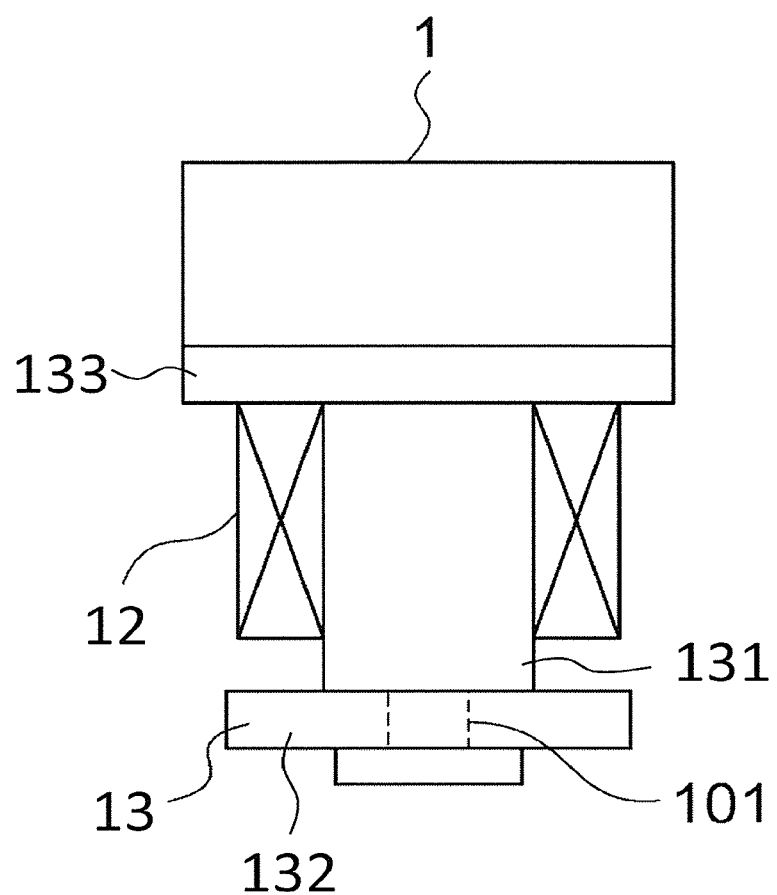
FIG. 7 is a front view for illustrating a stator core and a stator coil end portion of FIG. 1.
Figure 8:
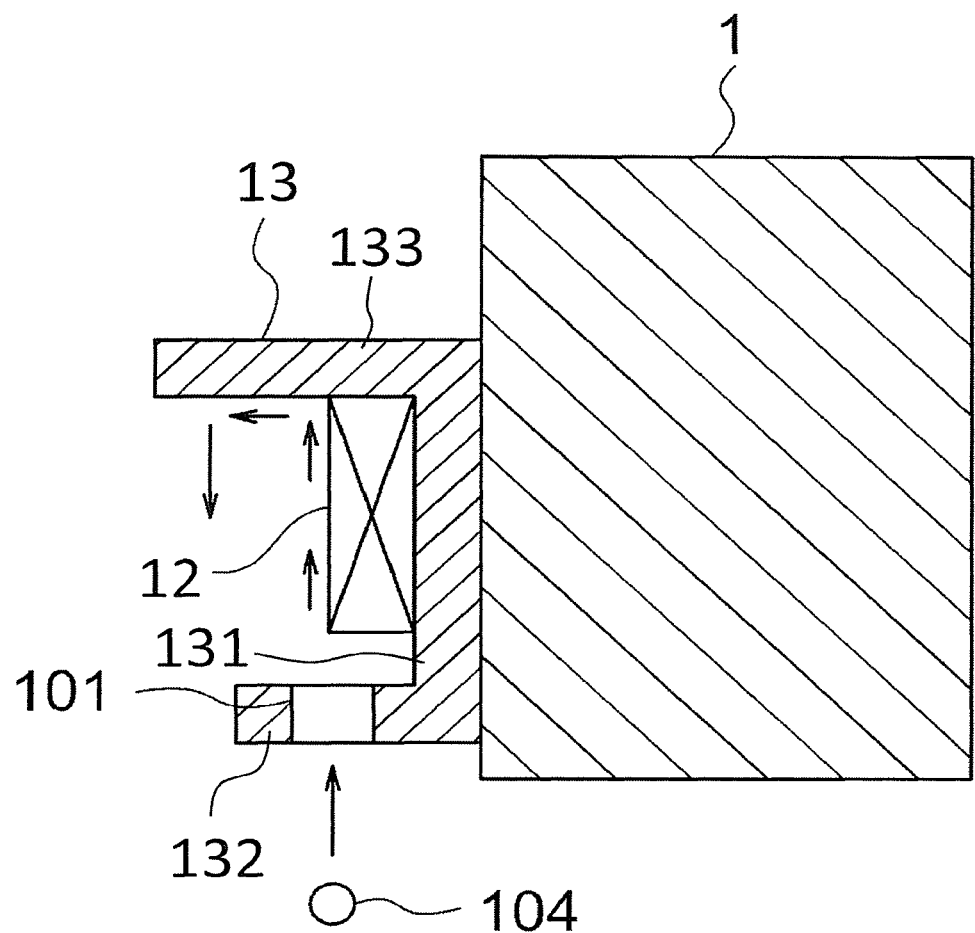
FIG. 8 is a side view for illustrating the stator core and the stator coil end portion of FIG. 7.

FIG. 7 is a front view for illustrating the stator core 1 and the stator coil end portion 12 of FIG. 1. FIG. 8 is a side view for illustrating the stator core 1 and the stator coil end portion 12 of FIG. 7. A first through-hole 101 is formed in the radially inner protruding portion 132 that is a portion of the insulator 13 made of a resin on the rotor 8 side. The cooling oil 104 having flown from the rotor 8 passes through the first through-hole 101 to collide with the surface of the stator coil end portion 12. With this, the stator coil end portion 12 is effectively cooled. The first through-hole 101 and the insulating paper arranged in a side surface portion of the stator core 1 do not influence each other.

In this cooling method, through cooling of the axial both end portions of the stator core 1 and the stator coil 11, the heat in an axial intermediate portion of the stator 40 can be cooled from both sides, and the stator 40 can be efficiently cooled. As illustrated in FIG. 6, the rotary electric machine according to the first embodiment includes a plurality of units each including the stator coil end portion 12 and the insulator 13 having the above-mentioned configurations. The plurality of units are arranged side by side in the circumferential direction on one surface of the stator core 1. Therefore, the cooling oil 104 having flown from the rotor 8 equally flies from the first through-hole 101 of each of the units to the stator coil end portion 12, and hence the rotary electric machine can be uniformly cooled.

When cooling by the insulator 13 is not prohibited, the effect improvement of 45% was obtained as compared to the case in which cooling by the insulator 13 is prohibited.

Further, the cooling oil 104 after cooling collides with the radially outer protruding portion 133 that is a portion of the insulator 13 on the radially outer side and drops in a gravity direction. Thus, the cooling oil 104 can be stored in the rotary electric machine. The stored cooling oil 104 is sucked out from the rotary electric machine with a pump or the like that is constantly operated. The cooling oil 104 thus sucked out is fed to a radiator to be cooled. The cooled cooling oil 104 passes through the inlet 26 again to be supplied to the rotary electric machine. Through the above-mentioned series of circulations of the cooling oil 104, the rotary electric machine can be cooled with high efficiency.

As one example, description is given of the structure in which the first through-hole 101 in the insulator 13 is configured to cause the cooling oil 104 from the rotor 8 to flow into the stator coil end portion 12. However, the present invention is not limited to this structure and may have various structures.

As described above, the rotary electric machine according to the first embodiment of the present invention has the following configuration. The rotary electric machine includes the first refrigerant passage through which the cooling oil 104 passes from the shaft 14 to the rotor core 17. The rotor core 17 includes the second refrigerant passage through which the cooling oil 104 having passed through the first refrigerant passage passes. The insulator 13 includes the base portion 131, the radially inner protruding portion 132, and the axially outer protruding portion 133. The base portion 131 is opposed to the axial end portion of the stator core 1. The radially inner protruding portion 132 is formed on the radially inner side of the base portion 131 and extends from the base portion 131 in the direction of separating from the stator core 1 in the axial direction. The radially outer protruding portion 133 is formed on the radially outer side of the base portion 131 and extends from the base portion 131 in the direction of separating from the stator core 1 in the axial direction. The radially inner protruding portion 132 has the first through-hole 101 penetrating therethrough in the radial direction, and the cooling oil 104 having passed through the second refrigerant passage passes through the first through-hole 101 to travel to the stator coil end portion 12. Therefore, the cooling oil 104 is held on the stator coil end portion 12. As a result, cooling efficiency can be improved.

Further, when the rotor 8 is rotated, the cooling oil 104 having passed through the second refrigerant passage passes through the first through-hole 101 to reach the stator coil end portion 12. Therefore, through drive of the rotary electric machine, the stator core 1 and the stator coil end portion 12 can be cooled.

Second Embodiment

Figure 9:
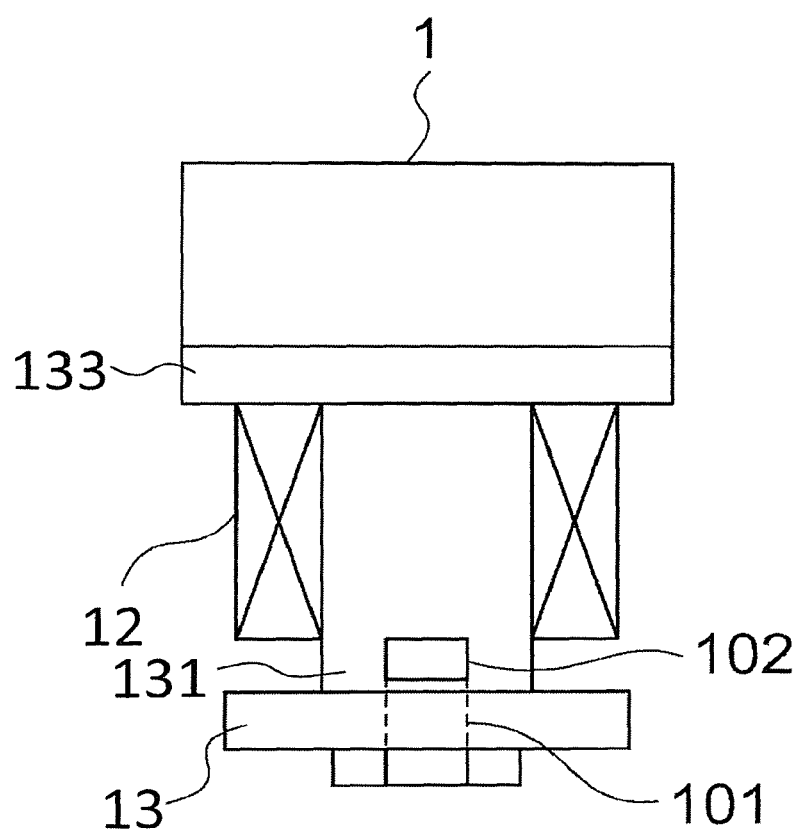
FIG. 9 is a front view for illustrating a stator core and a stator coil end portion in a rotary electric machine according to a second embodiment of the present invention.
Figure 10:
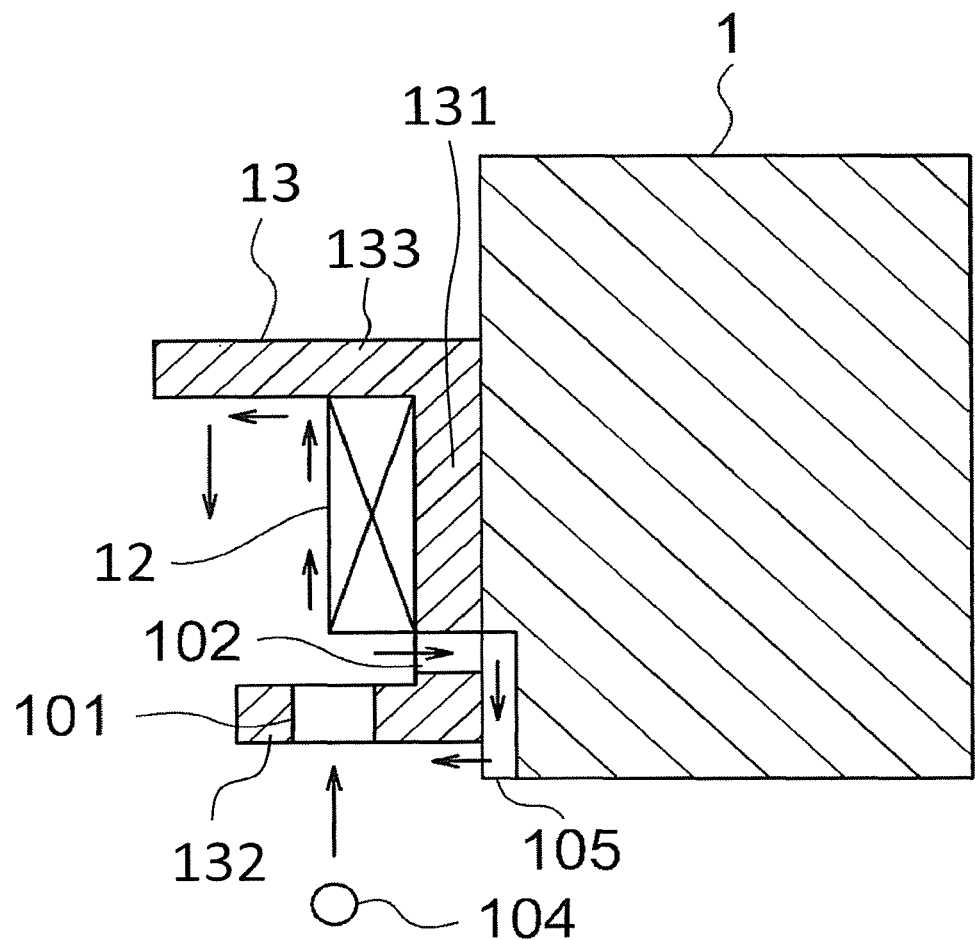
FIG. 10 is a side view for illustrating the stator core and the stator coil end portion of FIG. 9.

FIG. 9 is a front view for illustrating a stator core and a stator coil end portion in a rotary electric machine according to a second embodiment of the present invention. FIG. 10 is a side view for illustrating the stator core and the stator coil end portion of FIG. 9. In the second embodiment, the rotary electric machine is cooled through use of the cooling oil 104 flying from the rotor 8 in the same manner as in the first embodiment, and hence only portions different from those of the first embodiment are described.

In a portion of the base portion 131 of the insulator 13 on the shaft 14 side from the stator coil end portion 12, a second through-hole 102 penetrating through the base portion 131 in the axial direction is formed. In each of the axial both end portions of the stator core 1, a first cooling groove 105 that communicates to the second through-hole 102 is formed. The first cooling groove 105 is formed so as to extend in the radial direction. The other configurations are the same as those of the first embodiment.

With the above-mentioned configuration, the cooling oil 104 flying from the rotor 8 is divided into flows in two directions. One of the flows passes through the first through-hole 101 to collide with the stator coil end portion 12 and travels to the radially outer side along the surface of the stator coil end portion 12. Another of the flows passes through the second through-hole 102 to be brought into contact with the stator core 1.

When the cooling oil 104 flows in the radial direction along the surface of the stator coil end portion 12, the stator coil end portion 12 is efficiently cooled. When the cooling oil 104 passing through the second through-hole 102 is brought into contact with the stator core 1, end surfaces of the axial both end portions of the stator core 1 are cooled in a wide range. The cooling oil 104 having cooled the stator core 1 is discharged through the first cooling groove 105.

In this structure, the stator core 1 and the stator coil end portion 12 are cooled by applying the cooling oil 104 thereto. Further, through cooling of the stator core 1 from the axial both end portions, the heat in the axial intermediate portion of the stator core 1 can be effectively reduced from both the end portions. With this, the stator 40 can be efficiently cooled.

The cooling oil 104 having been used for cooling each of the stator core 1 and the stator coil end portion 12 passes through the first cooling groove 105 or collides with the radially outer protruding portion 133 of the insulator 13, to thereby drop to be stored in a lower portion of the rotary electric machine. The stored cooling oil 104 is sucked out with a pump or the like that is constantly operated in the same manner as in the first embodiment. The cooling oil 104 is cooled with a radiator or the like and supplied to each portion from the inlet 26 again. With this, the cooling oil 104 is circulated.

As described above, in the rotary electric machine according to the second embodiment of the present invention, the second through-hole 102 that extends in the axial direction is formed in the base portion 131, and hence the stator core 1 can be more effectively cooled.

In the second embodiment, as one example, description is given of the configuration in which the cooling oil 104 that is liquid refrigerant from the rotor 8 is caused to flow into the stator coil end portion 12 through the first through-hole 101 formed in the insulator 13, and the cooling oil 104 is discharged from the first cooling groove 105 through the second through-hole 102 formed in the insulator 13. However, the present invention is not limited to this structure and may have various structures.

Third Embodiment

Figure 11:
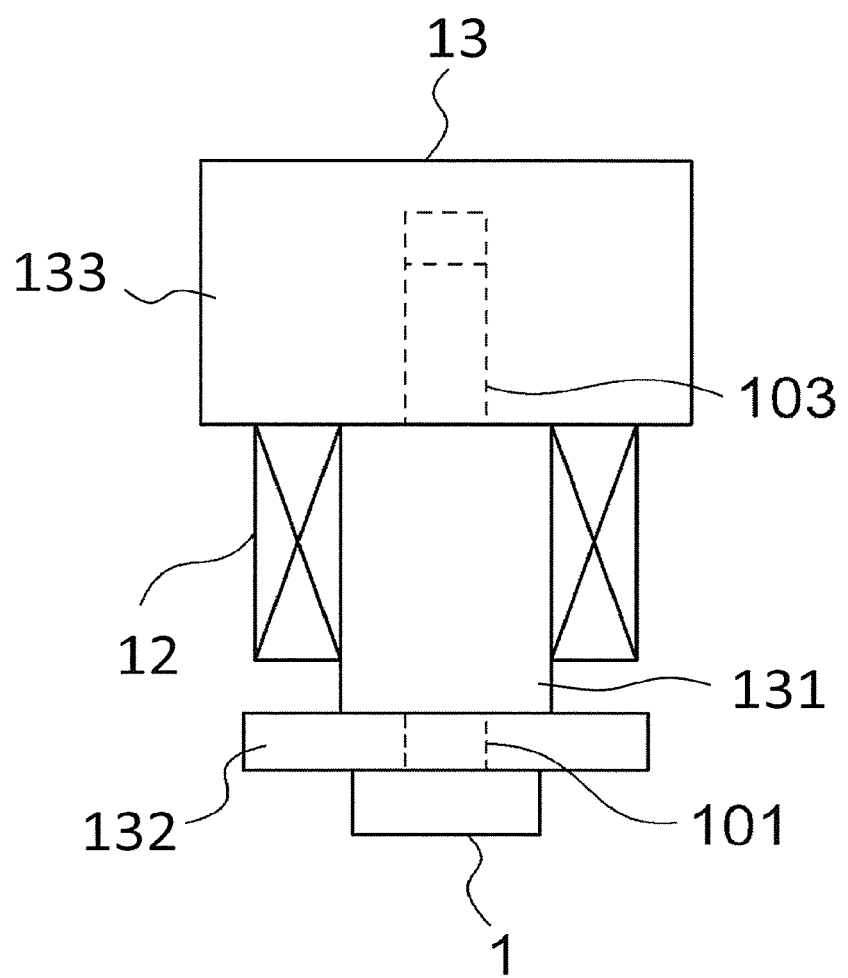
FIG. 11 is a front view for illustrating a stator core and a stator coil end portion in a rotary electric machine according to a third embodiment of the present invention.
Figure 12:
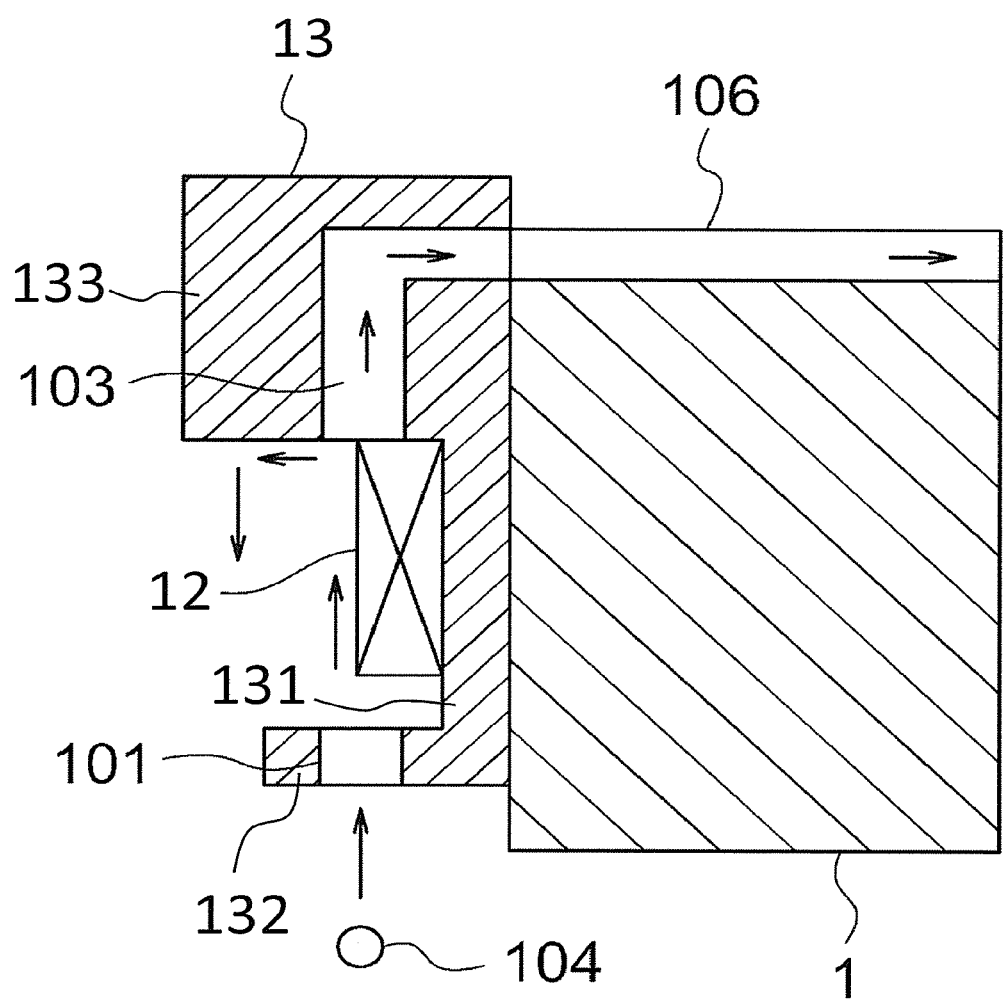
FIG. 12 is a side view for illustrating the stator core and the stator coil end portion of FIG. 11.

FIG. 11 is a front view for illustrating a stator core and a stator coil end portion in a rotary electric machine according to a third embodiment of the present invention. FIG. 12 is a side view for illustrating the stator core and the stator coil end portion of FIG. 11. In the third embodiment, the rotary electric machine is cooled through use of the cooling oil 104 flying from the rotor 8 in the same manner as in the first embodiment, and hence only portions different from those of the first embodiment are described.

A radially outer end surface in the radially outer protruding portion 133 of the insulator 13 is formed on the radially outer side from a radially outer end surface of the stator core 1. Further, the radially outer protruding portion 133 of the insulator 13 has a third through-hole 103 formed on an extension line of the first through-hole 101. A radially outer portion of the third through-hole 103 is formed so as to be directed to the stator core 1. The radially outer end surface of the stator core 1 has a second cooling groove 106 that communicates to the third through-hole 103. The second cooling groove 106 is formed at such a position that the path of a magnetic flux generated in the stator core 1 when an electric current flows through the stator coil 11 is not inhibited. The other configurations are the same as those of the first embodiment.

With this configuration, the cooling oil 104 having passed through the first through-hole 101 is supplied to the third through-hole 103, and the cooling oil 104 having passed through the third through-hole 103 can be caused to flow through the second cooling groove 106 of the stator core 1. With this, the cooling oil 104 is supplied from the second cooling groove 106 to the axial both end portions of the stator core 1. Therefore, the cooling oil 104 can be supplied to the stator core 1 in a wider range in the axial direction. Further, the radially outer end surface of the stator core 1 can be cooled.

Further, the cooling oil 104 is supplied from the second cooling groove 106 to the axial both end portions of the stator core 1. Therefore, the cooling oil 104 that is filled into the second cooling groove 106 enters an air layer formed in a gap between the stator core 1 and the frame 2. With this, the contact thermal resistance that prevents the transfer of heat can be reduced. As a result, the transfer of heat from the stator core 1 to the center frame 3 can be accelerated, and hence the high effect of cooling of an intermediate portion of the stator core 1 as well as the stator coil end portion 12 can be obtained.

As described above, in the rotary electric machine according to the third embodiment of the present invention, the third through-hole 103 through which the cooling oil 104 having passed by the stator coil end portion 12 passes to travel to the stator core 1 is formed in the radially outer protruding portion 133. Therefore, the stator core 1 can be effectively cooled.

Further, the stator core 1 has the second cooling groove 106 that communicates to the third through-hole 103, and hence the stator core 1 can be more effectively cooled.

In the third embodiment, description is given of the configuration in which the cooling oil 104 is caused to flow into the stator coil end portion 12 from the rotor 8 through the first through-hole 101 formed in the insulator 13, and the cooling oil 104 is filled into the second cooling groove 106 through the third through hole 103 formed in the insulator 13. However, the present invention is not limited to this configuration and may have various configurations.

Fourth Embodiment

Figure 13:
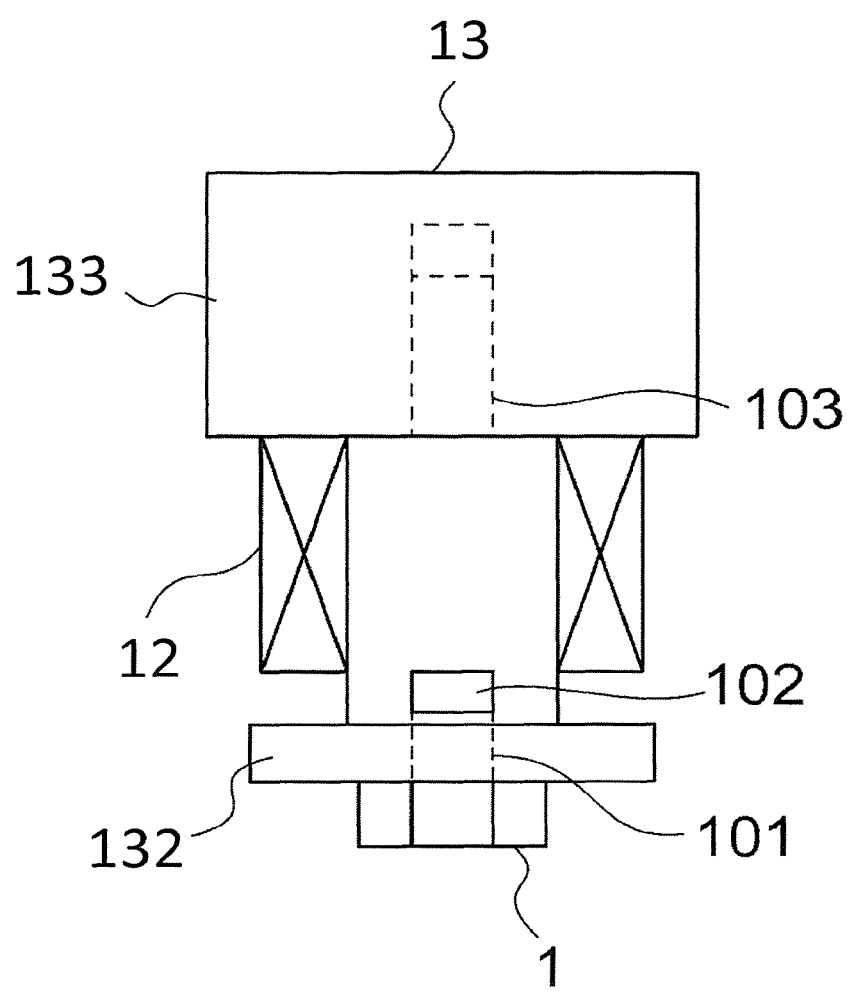
FIG. 13 is a front view for illustrating a stator core and a stator coil end portion in a rotary electric machine according to a fourth embodiment of the present invention.
Figure 14:
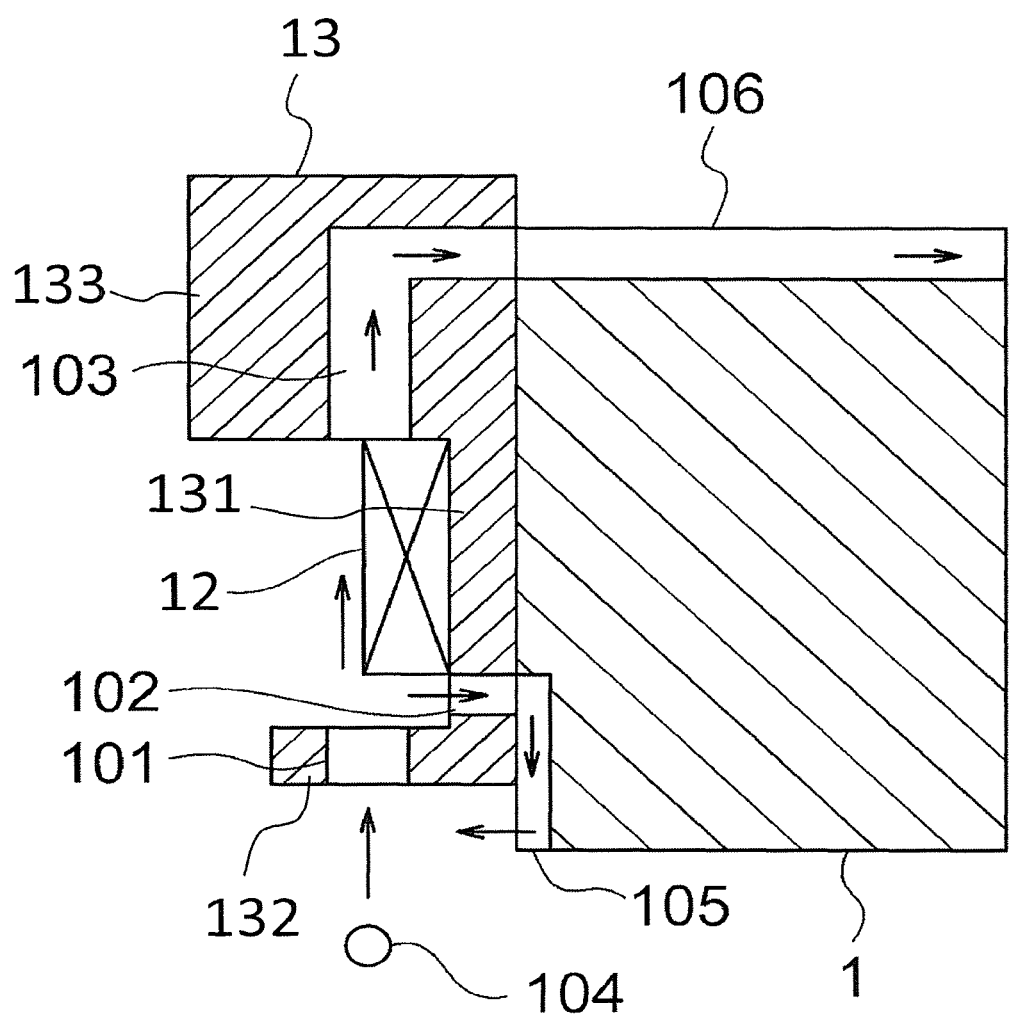
FIG. 14 is a side view for illustrating the stator core and the stator coil end portion of FIG. 13.

FIG. 13 is a front view for illustrating a stator core and a stator coil end portion in a rotary electric machine according to a fourth embodiment of the present invention. FIG. 14 is a side view for illustrating the stator core and the stator coil end portion of FIG. 13. In the fourth embodiment, only the flow passages of the cooling oil 104 are different from those of the second embodiment and the third embodiment. Therefore, only different portion are described, and description of the other portions is omitted.

As in the third embodiment, a radially outer end surface in the radially outer protruding portion 133 of the insulator 13 is formed on the radially outer side from a radially outer end surface of the stator core 1. Further, the radially outer protruding portion 133 of the insulator 13 has a third through-hole 103 formed on an extension line of the first through-hole 101. A radially outer portion of the third through-hole 103 is formed so as to be directed to the stator core 1. The radially outer end surface of the stator core 1 has a second cooling groove 106 that communicates to the third through-hole 103. The second cooling groove 106 is formed at such a position that the path of a magnetic flux generated in the stator core 1 when an electric current flows through the stator coil 11 is not inhibited.

As in the second embodiment, in a portion of the base portion 131 of the insulator 13 on the shaft 14 side from the stator coil end portion 12, a second through-hole 102 penetrating through the base portion 131 in the axial direction is formed. In each of the axial both end portions of the stator core 1, a first cooling groove 105 that communicates to the second through-hole 102 is formed. The first cooling groove 105 is formed so as to extend in the radial direction. The other configurations are the same as those of the second embodiment and the third embodiment.

With the above-mentioned configuration, the cooling oil 104 flying from the rotor 8 is divided into flows in two directions. One of the flows passes through the first through-hole 101 to collide with the stator coil end portion 12 and travels to the radially outer side along the surface of the stator coil end portion 12. Another of the flows passes through the second through-hole 102 to be brought into contact with the stator core 1.

The cooling oil 104 having passed through the first through-hole 101 flows in the radial direction along the surface of the stator coil end portion 12 to cool the stator coil end portion 12. Further, the cooling oil 104 is supplied to the second cooling groove 106 to enable cooling of the stator core 1 from the radially outer end surface of the stator core 1.

Further, the cooling oil 104 having passed through the second through-hole 102 is guided to the end surface of each of the axial both end portions of the stator core 1 and discharged through the first cooling groove 105. Therefore, the end surfaces of the axial both end portions of the stator core 1 can be cooled. As described above, through effective cooling of the stator core 1 from the radially outer end surface and the axial both end surfaces thereof, the transfer of heat from the stator core 1 to the center frame 3 is accelerated to obtain the high effect of cooling of portions also including the intermediate portion of the stator core 1.

As described above, in the rotary electric machine according to the fourth embodiment of the present invention, both the effects of the second embodiment and the third embodiment can be obtained.

In the fourth embodiment, as one example, description is given of the configuration in which the cooling oil 104 from the rotor 8 is caused to flow into the stator coil end portion 12 through the first through-hole 101 formed in the insulator 13, the cooling oil 104 is discharged from the first cooling groove 105 through the second through-hole 102 formed in the insulator 13, and the cooling oil 104 is filled into the second cooling groove 106 through the third through-hole 103 formed in the insulator 13. However, the present invention is not limited to this configuration and may have various configurations.

Fifth Embodiment

Figure 15:
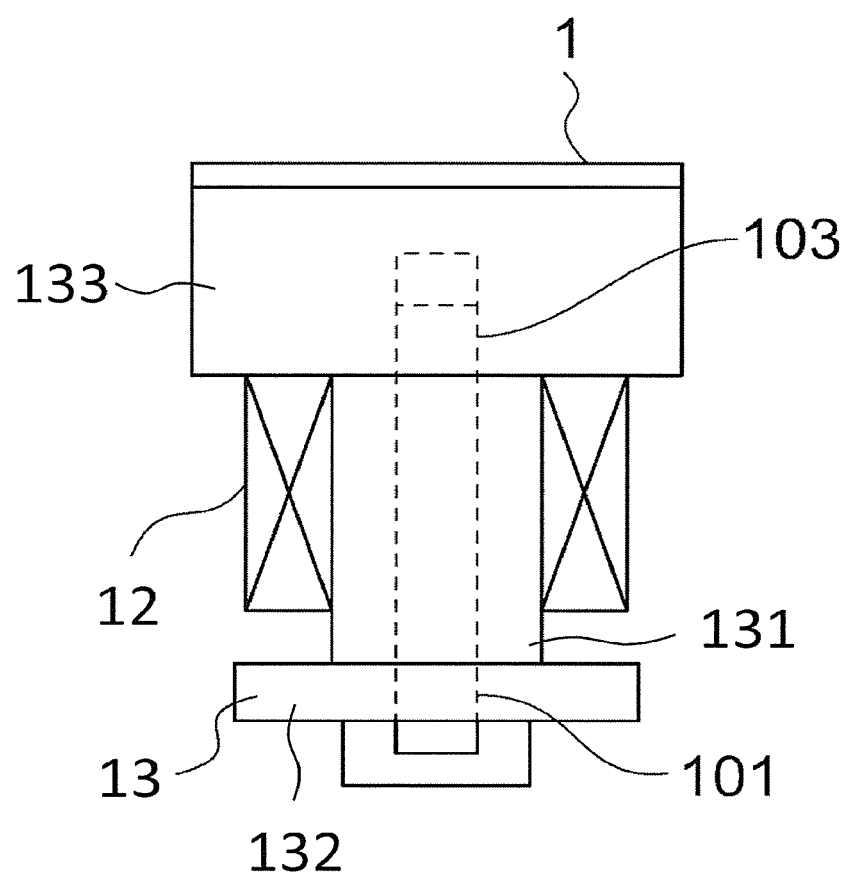
FIG. 15 is a front view for illustrating a stator core and a stator coil end portion in a rotary electric machine according to a fifth embodiment of the present invention.
Figure 16:
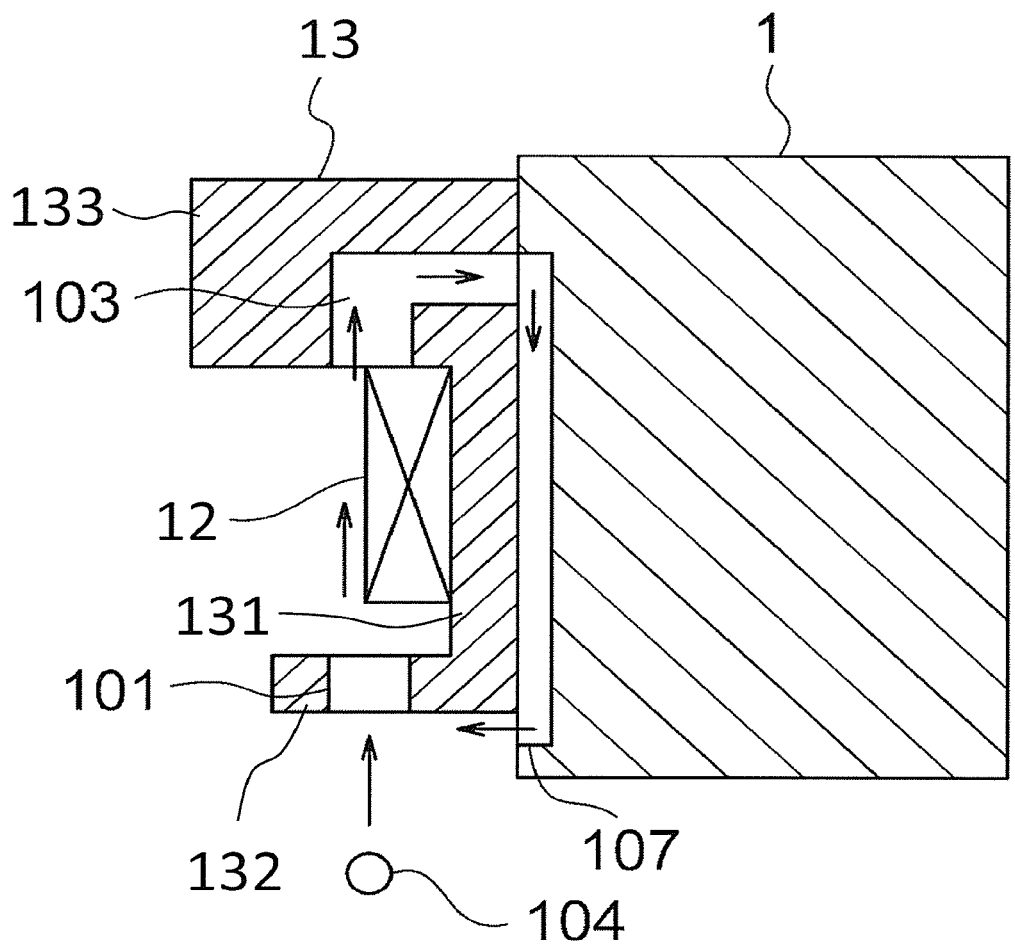
FIG. 16 is a side view for illustrating the stator core and the stator coil end portion of FIG. 15.

FIG. 15 is a front view for illustrating a stator core and a stator coil end portion in a rotary electric machine according to a fifth embodiment of the present invention. FIG. 16 is a side view for illustrating the stator core and the stator coil end portion of FIG. 15. In the fifth embodiment, only the flow passages of the cooling oil 104 are different from those of the second embodiment. Therefore, only different portion are described, and description of the other portions is omitted.

The radially outer protruding portion 133 of the insulator 13 has the third through-hole 103 formed on the extension line of the first through-hole 101. A third cooling groove 107 that extends in the radial direction is formed in each of the axial both end portions of the stator core 1. A radially outer portion of the third through-hole 103 is formed so as to be directed to the stator core 1. The third cooling grove 107 communicates to the third through-hole 103. A radially inner end portion of the third cooling grove 107 is formed on a radially inner side from a radially inner end portion of the insulator 13. The other configurations are the same as those of the second embodiment.

With the above-mentioned configuration, the cooling oil 104 having flown from the rotor 8 passes through the first through-hole 101 to travel to a radially outer side along the surface of the stator coil end portion 12, to thereby cool the stator coil end portion 12. The cooling oil 104 having cooled the stator coil end portion 12 passes through the third through-hole 103 and further passes through the third cooling groove 107. When the cooling oil 104 passes through the third cooling grooves 107, the axial both end portions of the stator core 1 are cooled. With this, the stator coil end portion 12 and the stator core 1 can be effectively cooled at the same time, and the heat in an axial center portion can be effectively cooled from the axial both end portions. As a result, the effect of cooling the stator core 1 and the stator coil end portion 12 with the cooling oil 104 can be enhanced.

Further, the cooling oil 104 having been used for cooling is discharged from the third cooling groove 107 and drop to be stored in a lower portion of the rotary electric machine. The stored cooling oil 104 is sucked out with a pump or the like that is constantly operated in the same manner as in the first embodiment. The cooling oil 104 is cooled with a radiator or the like and supplied to each portion from the inlet 26 again. With this, the cooling oil 104 is circulated.

As described above, in the rotary electric machine according to the fifth embodiment of the present invention, the third cooling groove 107 that communicates to the third through-hole 103 is formed in the stator core 1, and the third cooling groove 107 extends from the portion communicating to the third through-hole 103 in the stator core 1 to the portion on the radially inner side from the radially inner protruding portion 132. Therefore, the stator core 1 can be more effectively cooled.

In the fifth embodiment, as one example, description is given of the configuration in which the cooling oil 104 from the rotor 8 is caused to flow into the stator coil end portion 12 through the first through-hole 101 formed in the insulator 13, the cooling oil 104 is discharged from the third cooling groove 107 through the third through-hole 103 formed in the insulator 13. However, the present invention is not limited to this configuration and may have various configurations.

Sixth Embodiment

Figure 17:
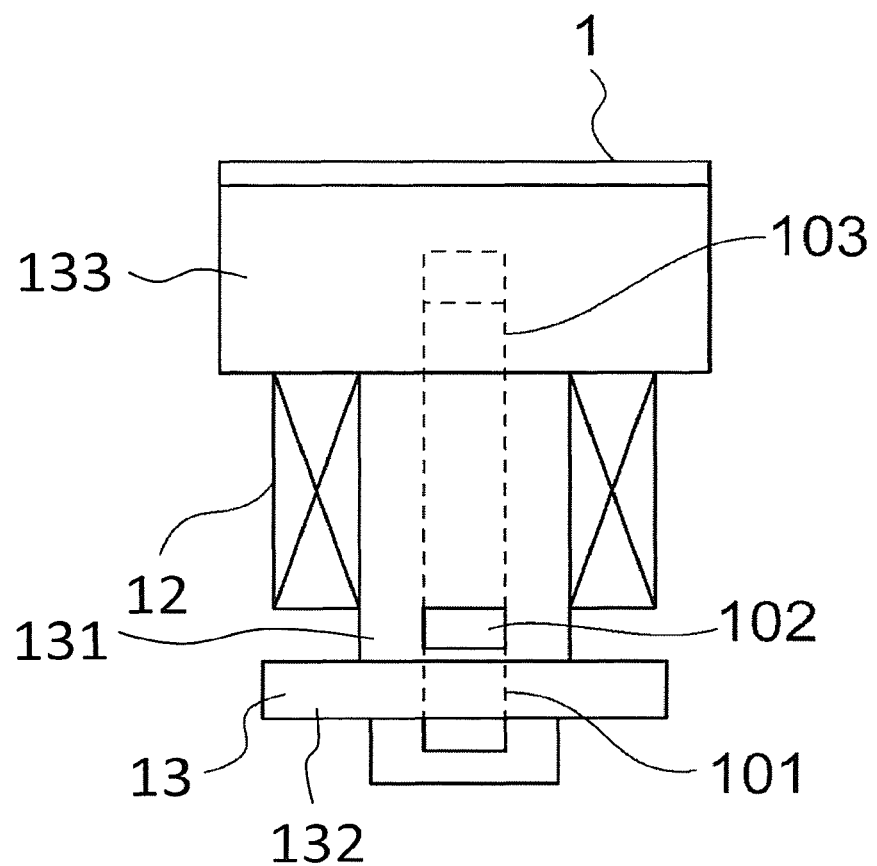
FIG. 17 is a front view for illustrating a stator core and a stator coil end portion in a rotary electric machine according to a sixth embodiment of the present invention.
Figure 18:
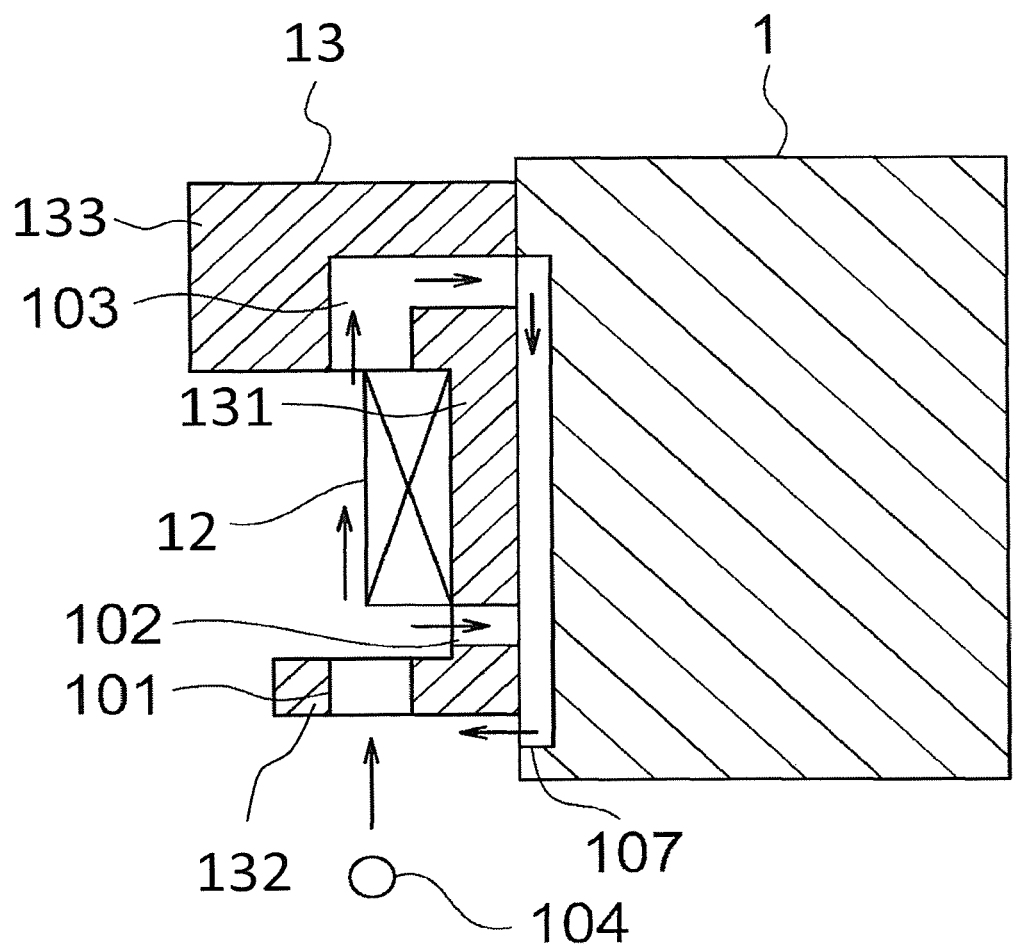
FIG. 18 is a side view for illustrating the stator core and the stator oil end portion of FIG. 17.

FIG. 17 is a front view for illustrating a stator core and a stator coil end portion in a rotary electric machine according to a sixth embodiment of the present invention. FIG. 18 is a side view for illustrating the stator core and the stator coil end portion of FIG. 17. In the sixth embodiment, only the flow passages of the cooling oil 104 are different from those of the fifth embodiment. Therefore, only different portion are described, and description of the other portions is omitted.

In a portion of the base portion 131 of the insulator 13 on the shaft 14 side from the stator coil end portion 12, a second through-hole 102 penetrating through the base portion 131 in the axial direction is formed. In each of the axial both end portions of the stator core 1, the third cooling groove 107 that extends in the radial direction is formed. The third cooling groove 107 communicates to the third through-hole 103 and the second through-hole 102. The cooling oil 104 having passed through the first through-hole 101 is divided into a flow that passes through the third through-hole 103 and a flow that passes through the second through-hole 102.

With the above-mentioned configuration, the cooling oil 104 having flown from the rotor 8 passes through the first through-hole 101 to travel to a radially outer side along the surface of the stator coil end portion 12, to thereby cool the stator coil end portion 12. The cooling oil 104 having cooled the stator coil end portion 12 passes through the third through-hole 103 and further passes through the third cooling groove 107. When the cooling oil 104 passes through the third cooling grooves 107, the axial both end portions of the stator core 1 are cooled.

Further, the cooling oil 104 having flown from the rotor 8 passes through the first through-hole 101 and passes through the second through-hole 102. Then the cooling oil 104 is brought into contact with the stator core 1, to thereby enable cooling of the axial both end portions of the stator core 1.

Further, with this configuration, through cooling of the stator core 1 and the stator coil end portion 12 from both ends in the axial direction, the heat in the axial center portion of the stator 40 can be effectively reduced from both the ends, and the effect of cooling the stator core 1 and the stator coil end portion 12 with the cooling oil 104 is enhanced.

Further, the cooling oil 104 having been used for cooling is discharged from the third cooling groove 107 and drop to be stored in a lower portion of the rotary electric machine. The stored cooling oil 104 is sucked out with a pump or the like that is constantly operated in the same manner as in the first embodiment. The cooling oil 104 is cooled with a radiator or the like and supplied to each portion from the inlet 26 again. With this, the cooling oil 104 is circulated.

As described above, the rotary electric machine according to the sixth embodiment of the present invention has the following configuration. The radially outer protruding portion 133 has the third through-hole 103 through which the cooling oil 104 having passed by the stator coil end portion 12 passes to travel to the stator core 1. The stator core 1 has the third cooling groove 107 that communicates to the third through-hole 103. The third cooling groove 107 extends from the portion communicating to the third through-hole 103 in the stator core 1 to the portion on the radially inner side from the radially inner protruding portion 132, and the third cooling groove 107 communicates to the second through hole 102. Therefore, the stator core 1 and the stator coil end portion 12 can be more effectively cooled.

In the sixth embodiment, as one example, description is given of the configuration in which the cooling oil 104 from the rotor 8 is caused to flow into the stator coil end portion 12 through the first through-hole 101 formed in the insulator 13, the cooling oil 104 is discharged to the third cooling groove 107 through the second through-hole 102 and the third through-hole 103 formed in the insulator 13. However, the present invention is not limited to this configuration and may have various configurations.

Seventh Embodiment

Figure 19:
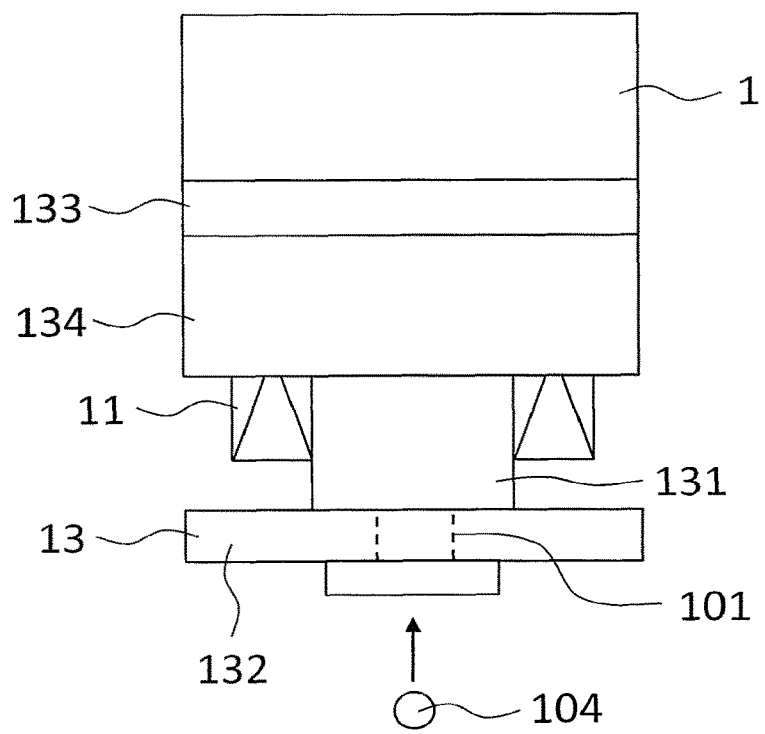
FIG. 19 is a front view for illustrating main parts of a stator core and a stator coil end portion in a rotary electric machine according to a seventh embodiment of the present invention.
Figure 20:
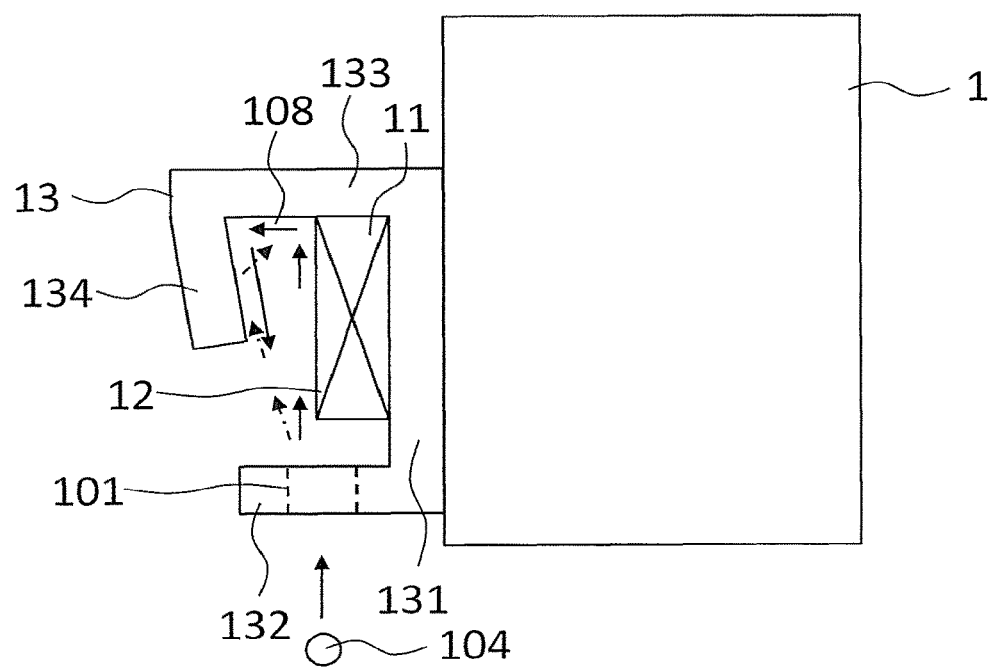
FIG. 20 is a side view for illustrating the stator core and the stator coil end portion of FIG. 19.
Figure 21:
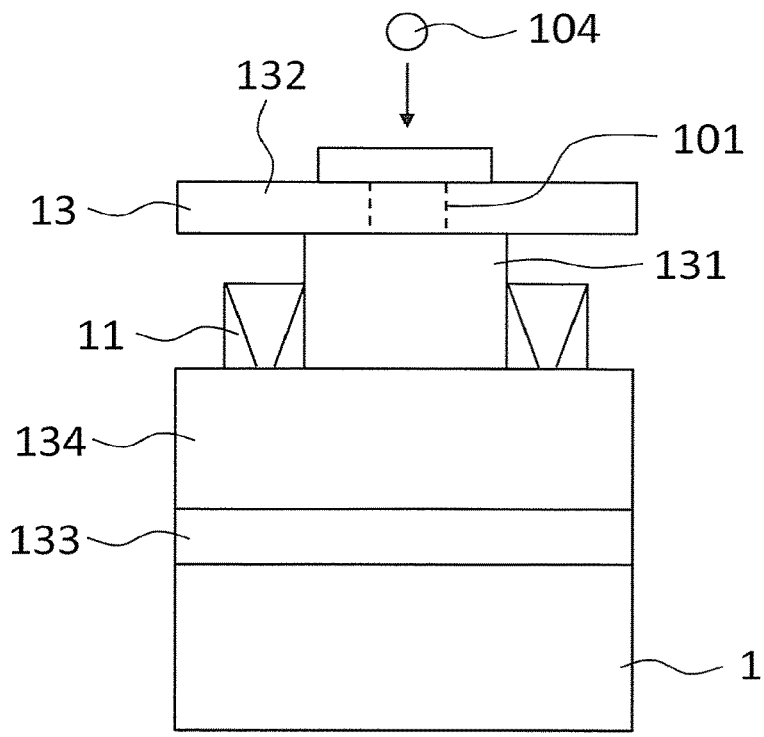
FIG. 21 is a front view for illustrating the main parts of the stator core and the stator coil end portion in the rotary electric machine according to the seventh embodiment of the present invention.
Figure 22:
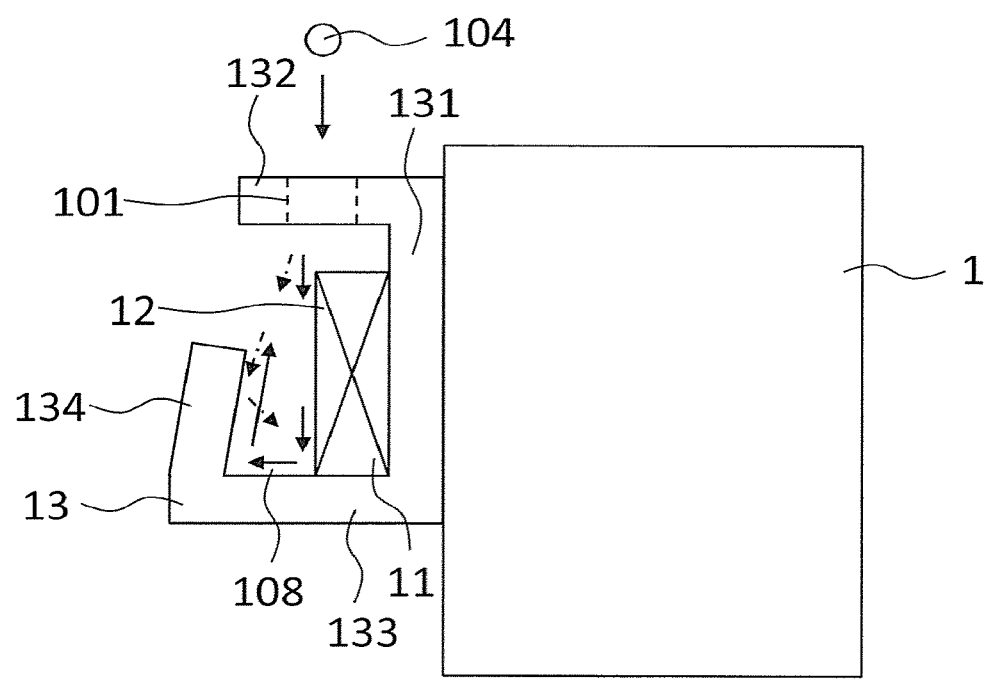
FIG. 22 is a side view for illustrating the stator core and the stator coil end portion of FIG. 21.
Figure 23:
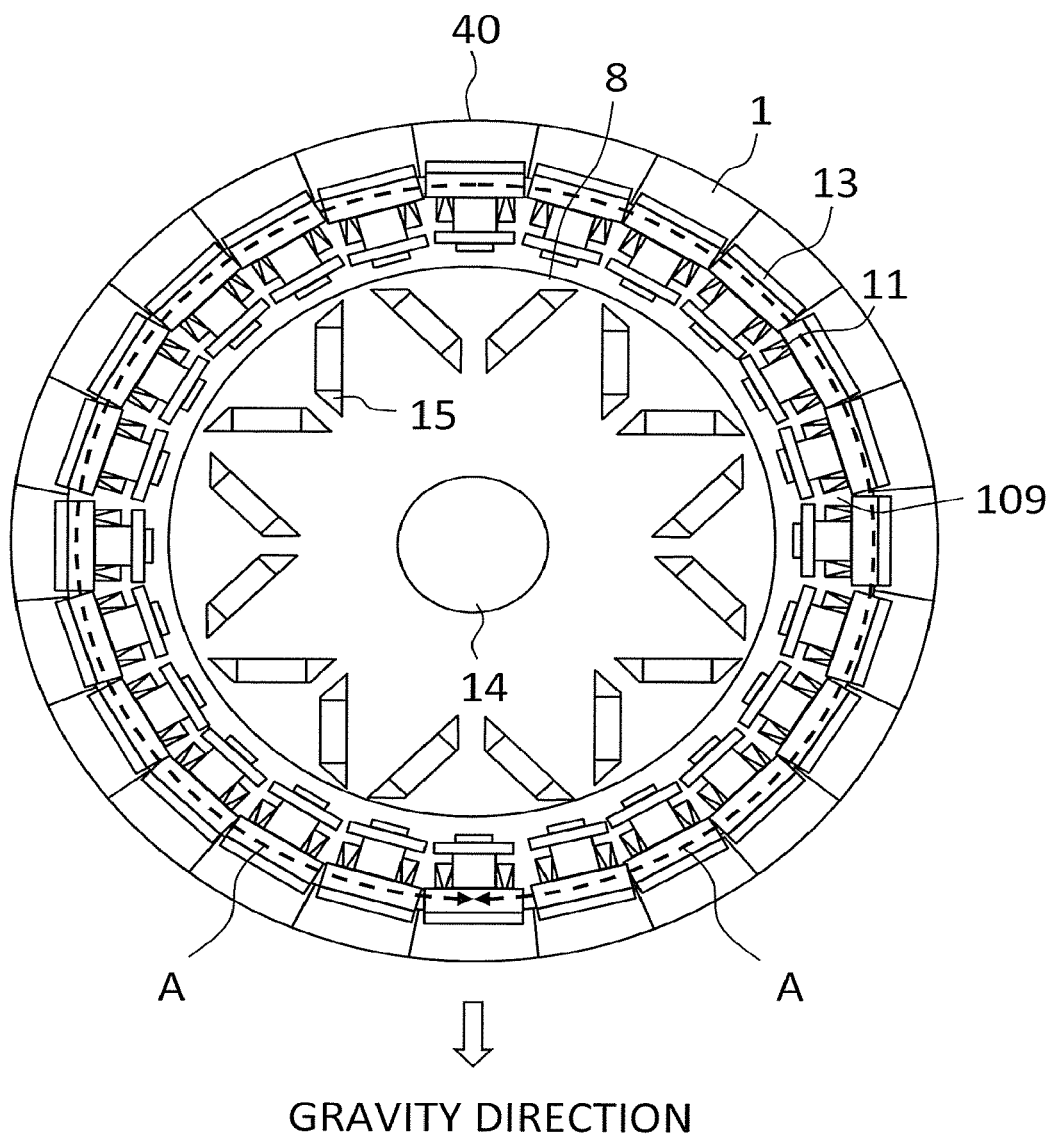
FIG. 23 is a front view for illustrating the rotary electric machine according to the seventh embodiment of the present invention.

FIG. 19 is a front view for illustrating main parts of a stator core and a stator coil end portion of a rotary electric machine according to a seventh embodiment of the present invention. FIG. 20 is a side view for illustrating the stator core and the stator coil end portion of FIG. 19. FIG. 21 is a front view for illustrating the main parts of the stator core and the stator coil end portion of the rotary electric machine according to the seventh embodiment of the present invention. FIG. 22 is a side view for illustrating the stator core and the stator coil end portion of FIG. 21. FIG. 23 is a front view for illustrating the rotary electric machine according to the seventh embodiment of the present invention. In FIG. 19 and FIG. 20, there are illustrated the stator core 1 and the stator coil end portion 12 arranged on an upper side from the rotor 8. In FIG. 21 and FIG. 22, there are illustrated the stator core 1 and the stator coil end portion 12 arranged on a lower side from the rotor 8.

In the seventh embodiment, the insulator 13 is arranged so as to surround the stator coil end portion 12 in the same manner as in the first embodiment. The insulator 13 includes the radially outer protruding portion 133 on the radially outer side, the radially inner protruding portion 132 on the radially inner side, and the base portion 131 between the stator coil end portion 12 and the stator coil 1. The radially outer protruding portion 133 is longer than the radially inner protruding portion 132. The radially inner protruding portion 132 has the first through-hole 101 for guiding the flying cooling oil 104 into the stator coil end portion 12.

The radially outer protruding portion 133 and the radially inner protruding portion 132 are connected to each other through intermediation of the base portion 131. Unlike the first embodiment, in the seventh embodiment, the insulator 13 further includes a shielding plate 134 formed in an end portion positioned on an opposite side from the connection side of the radially outer protruding portion 133 with respect to the base portion 131. The shielding plate 134 is arranged so as to extend from the radially outer protruding portion 133 to the radially inner side. Further, the shielding plate 134 is arranged so that a radially inner portion thereof is brought close to the stator coil end portion 12 as compared to a radially outer portion thereof. The shielding plate 134 is configured to prevent the cooling oil 104, which has passed through the first through-hole 101 to infiltrate a region between the radially inner protruding portion 132 and the radially outer protruding portion 133, from flying to an outside of the insulator 13.

With the above-mentioned configuration, the cooling oil 104 flying from the rotor 8 passes through the first through-hole 101 to collide with the surface of the stator coil end portion 12. The cooling oil 104 having collided with the surface of the stator coil end portion 12 flows from the radially inner side to the radially outer side along an end surface of the stator coil end portion 12 to collide with the radially outer protruding portion 133 of the insulator 13. The cooling oil 104 having collided with the radially outer protruding portion 133 flows from the stator coil end portion 12 to the shielding plate 134 along the radially outer protruding portion 133, and further flows from the radially outer side to the radially inner side along the shielding plate 134 to be brought close to the stator coil end portion 12. Further, the cooling oil 104 flying from the rotor 8 passes through the first through-hole 101 to collide with the surface of the shielding plate 134. The cooling oil 104 having collided with the surface of the shielding plate 134 flows from the radially inner side to the radially outer side along the surface of the shielding plate 134, to thereby collide with the radially outer protruding portion 133 of the insulator 13. The cooling oil 104 having collided with the radially outer protruding portion 133 flows from the shielding plate 134 to the stator coil end portion 12 along the radially outer protruding portion 133, and further flows from the radially outer side to the radially inner side along the stator coil end portion 12. Therefore, a space surrounded by the stator coil end portion 12, the radially outer producing portion 133, and the shielding plate 134 serves as a retaining portion 108 configured to retain the cooling oil 104 having passed through the first through-hole 101. The cooling oil 104 retained in the retaining portion 108 is more easily brought into contact with the stator coil end portion 12 that is a heat generating part. Thus, in the rotary electric machine according to the seventh embodiment, the contact time between the cooling oil 104 and the stator coil end portion 12 increases, and the effect of cooling the stator coil end portion 12 is enhanced.

Further, in the rotary electric machine according to the seventh embodiment, the cooling oil 104 flying from the rotor 8 equally flies to the stator coil end portions 12 of the stator 40 arranged along the periphery of the rotor 8 in the same manner as in the first embodiment. Therefore, the temperature variation in the circumferential direction of the rotary electric machine can be suppressed. As illustrated in FIG. 23, the rotary electric machine according to the seventh embodiment includes a plurality of units each including the stator coil end portion 12 and the insulator 13 having the above-mentioned configurations. The plurality of units are arranged side by side in the circumferential direction on one surface of the stator core 1. Therefore, the stator coil end portion 12 and the insulator 13 illustrated in FIG. 19 and FIG. 20 positioned on the upper side from the rotor 8 have a vertically reversed relationship with the stator coil end portion 12 and the insulator 13 illustrated in FIG. 21 and FIG. 22 positioned on the lower side from the rotor 8.

The units adjacent to each other in the circumferential direction are arranged so that the retaining portions 108 of the insulators 13 communicate to each other in order to accelerate the movement of the cooling oil 104 in the circumferential direction. With the structure illustrated in FIG. 23, in the stator 40 of the rotary electric machine, the retaining portions 108, which are each formed of the shielding plate 134 and the radially outer protruding portion 133, are arranged adjacently in the circumferential direction. Through continuous arrangement of the retaining portions 108 from an upper end to a lower end of the rotary electric machine, a refrigerant passage 109 is formed in the rotary electric machine. With this, in the upper end of the rotary electric machine, the cooling oil 104 having passed through the first through-hole 101 to infiltrate the region between the radially inner protruding portion 132 and the radially outer protruding portion 133 flows to drop in the gravity direction toward the lower end of the rotary electric machine along the refrigerant passage 109 in a direction indicated by the arrow A, with the result that the discharge of the cooling oil 104 is accelerated.

A gap for discharging the cooling oil 104 is formed between the radially inner protruding portions 132 of the insulators 13 arranged adjacently in the circumferential direction. The cooling oil 104 having passed through the first through-hole 101 to reach the region between the radially inner protruding portion 132 and the radially outer protruding portion 133 is heated by the heat generating part, for example, the stator coil end portion 12. The heated cooling oil 104 passes through the gap between the adjacent radially inner protruding portions 132 and flows to drop from the upper end to the lower end of the rotary electric machine, and during this process, the cooling oil 104 can be efficiently discharged. With this, the cooling oil 104 flying from the rotor 8 can be guided to the stator coil end portion 12 from the radially inner side to the radially outer side through the first through-hole 101, and hence the effect of suppressing the temperature variation in the circumferential direction of the stator coil end portions 12 can be maintained.

As described above, in the rotary electric machine according to the seventh embodiment of the present invention, the insulator 13 includes the shielding plate 134, which is formed on the radially outer protruding portion 133, and extends from the radially outer protruding portion 133 to the radially inner side so as to be brought close to the stator coil end portion 12. Therefore, the cooling oil 104 having passed through the first through-hole 101 to infiltrate the region between the radially inner protruding portion 132 and the radially outer protruding portion 133 can be prevented from flying to an outside of the insulator 13.

In the seventh embodiment, as one example, description is given of the configuration in which the cooling oil 104 from the rotor 8 is caused to collide with the stator coil end portion 12 through the first through-hole 101 formed in the insulator 13. However, the present invention is not limited to this configuration and may have various configurations.

Eighth Embodiment

Figure 24:
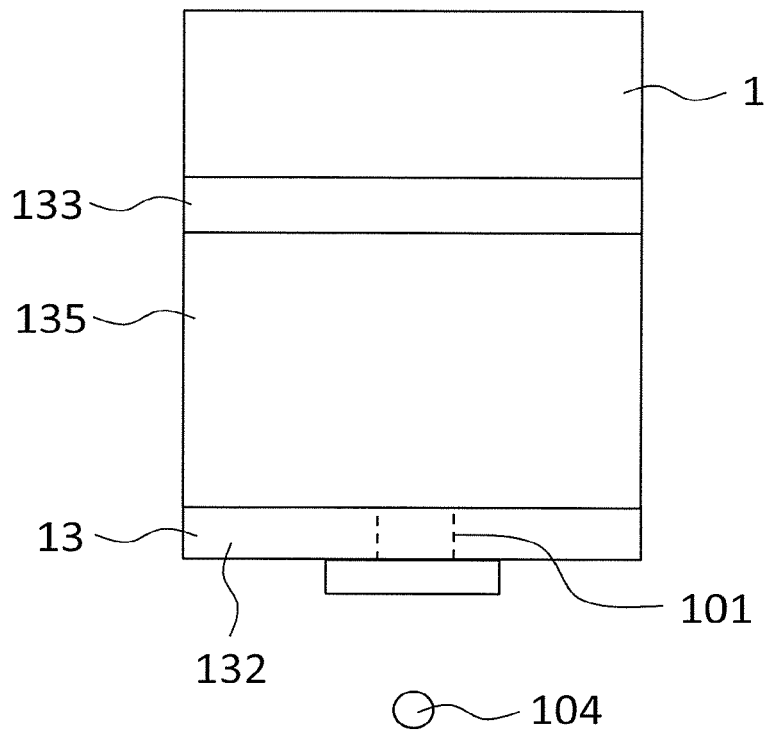
FIG. 24 is a front view for illustrating main parts of a stator core and a stator coil end portion in a rotary electric machine according to an eighth embodiment of the present invention.
Figure 25:
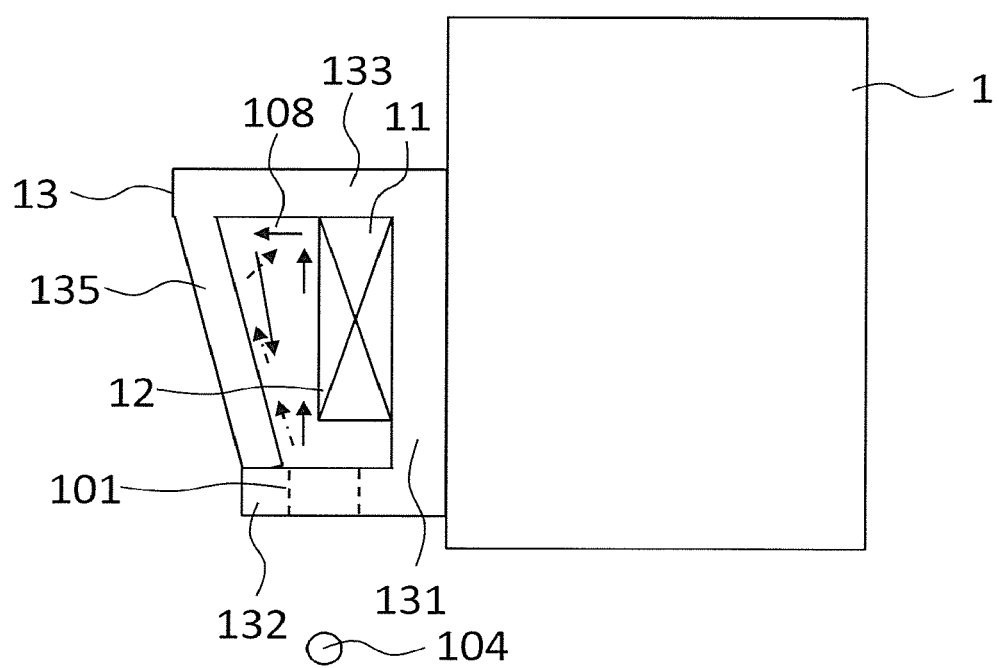
FIG. 25 is a side view for illustrating the stator core and the stator coil end portion of FIG. 24.
Figure 26:
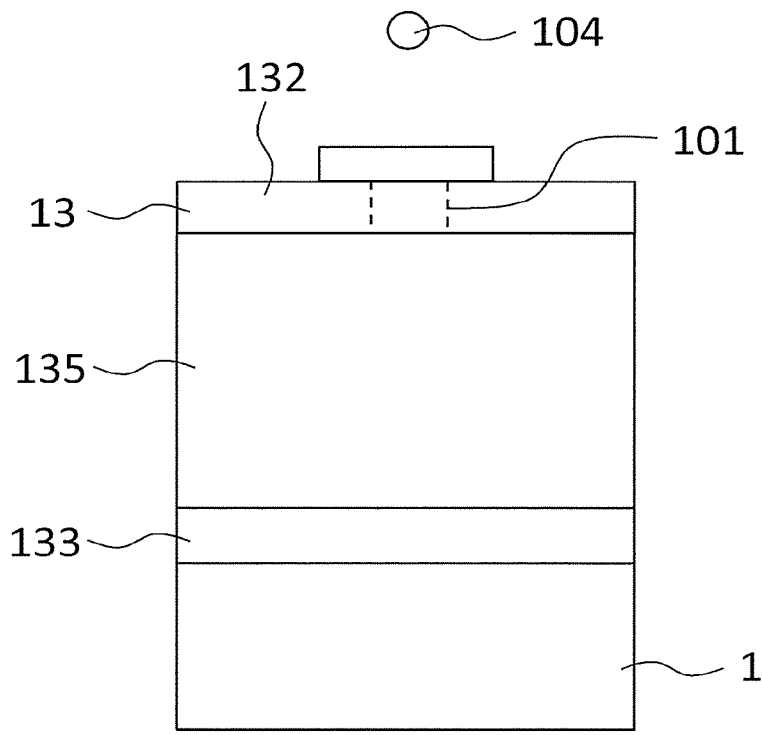
FIG. 26 is a front view for illustrating the main parts of the stator core and the stator coil in the rotary electric machine according to the eighth embodiment of the present invention.
Figure 27:
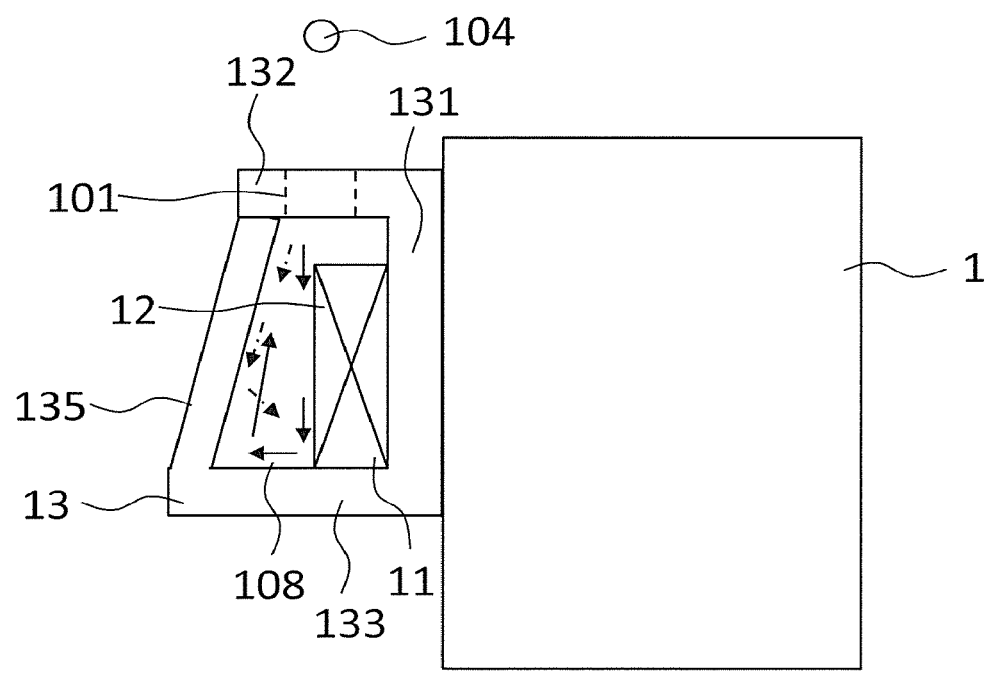
FIG. 27 is a side view for illustrating the stator core and the stator coil end portion of FIG. 26.
Figure 28:
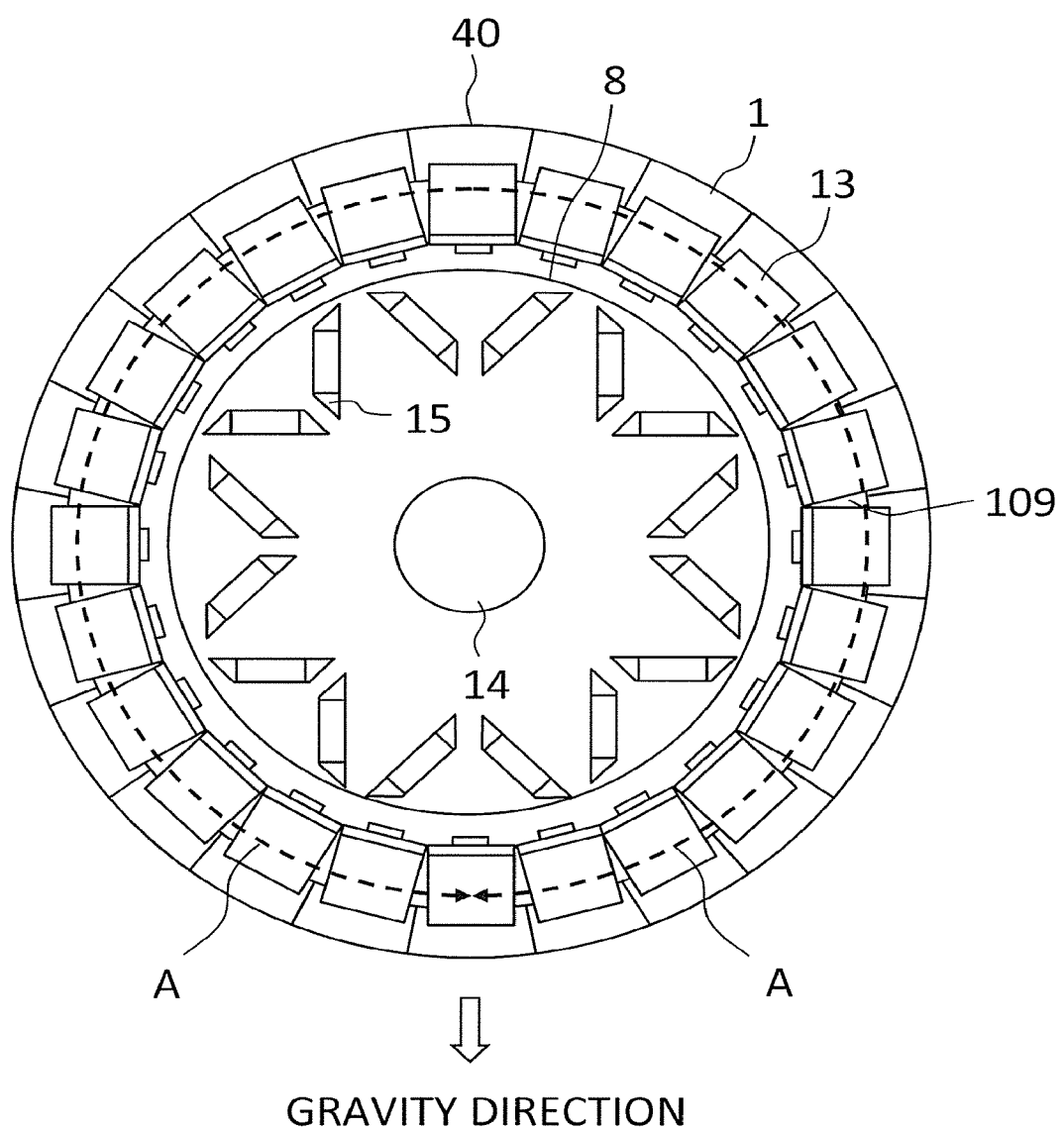
FIG. 28 is a front view for illustrating the rotary electric machine according to the eighth embodiment of the present invention.
Figure 29:
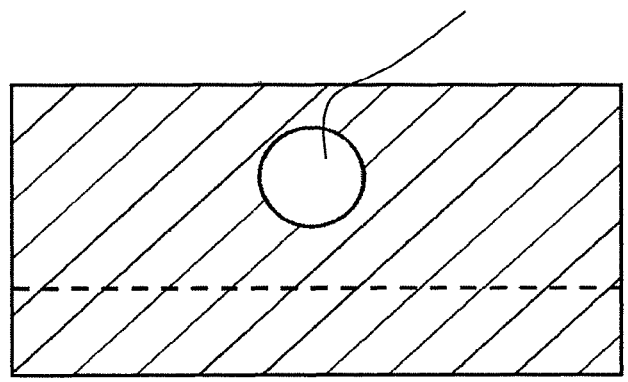
FIG. 29 is a sectional view for illustrating a modification example of a sectional shape of a first through-hole, a second through-hole, and a third through-hole.
Figure 30:
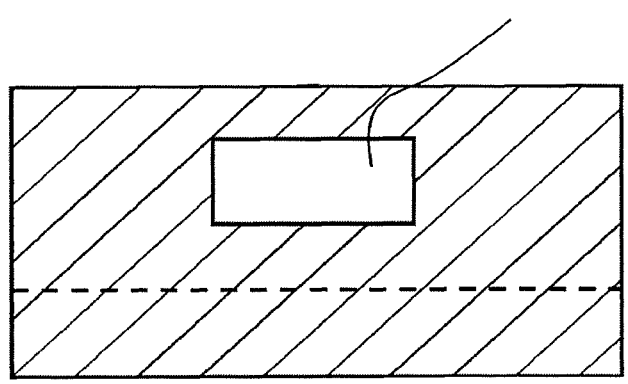
FIG. 30 is a sectional view for illustrating a modification example of the sectional shape of the first through-hole, the second through-hole, and the third through-hole.
Figure 31:
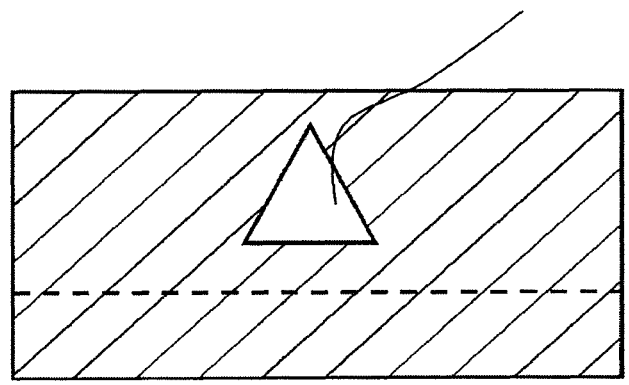
FIG. 31 is a sectional view for illustrating a modification example of the sectional shape of the first through-hole, the second through-hole, and the third through-hole.
Figure 32:
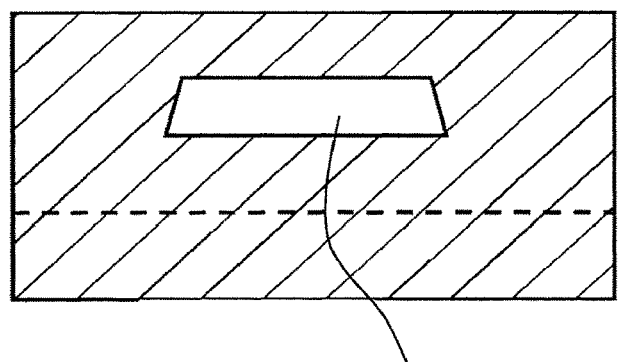
FIG. 32 is a sectional view for illustrating a modification example of the sectional shape of the first through-hole, the second through-hole, and the third through-hole.
Figure 33:
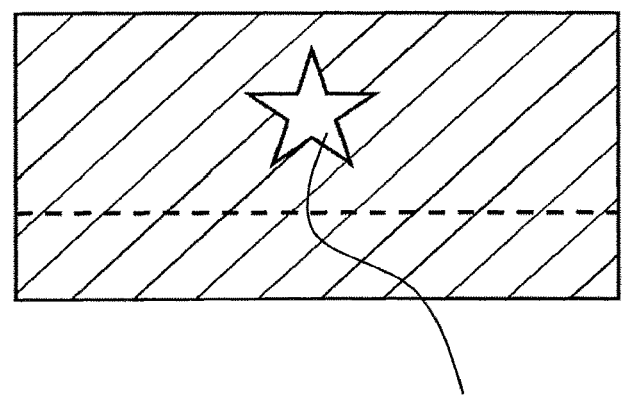
FIG. 33 is a sectional view for illustrating a modification example of the sectional shape of the first through-hole, the second through-hole, and the third through-hole.
Figure 34:
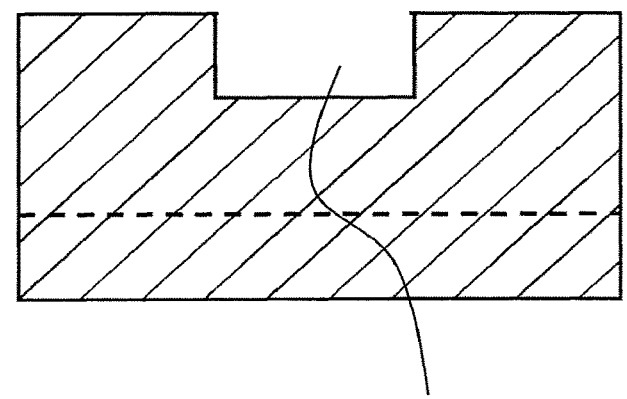
FIG. 34 is a sectional view for illustrating a modification example of the sectional shape of the first through-hole, the second through-hole, and the third through-hole.

FIG. 24 is a front view for illustrating main parts of a stator core and a stator coil end portion of a rotary electric machine according to an eighth embodiment of the present invention. FIG. 25 is a side view for illustrating the stator core and the stator coil end portion of FIG. 24. FIG. 26 is a front view for illustrating the main parts of the stator core and the stator coil end portion of the rotary electric machine according to the eighth embodiment of the present invention. FIG. 27 is a side view for illustrating the stator core and the stator coil end portion of FIG. 26. FIG. 28 is a front view for illustrating the rotary electric machine according to the eighth embodiment of the present invention. In FIG. 24 and FIG. 25, there are illustrated the stator core 1 and the stator coil end portion 12 arranged on an upper side from the rotor 8. In FIG. 26 and FIG. 27, there are illustrated the stator core 1 and the stator coil end portion 12 arranged on a lower side from the rotor 8.

In the eighth embodiment, only the refrigerant passage 109 of the cooling oil 104 is different from that of the seventh embodiment. Thus, only different portions are described, and description of the other portions is omitted. In the eighth embodiment, the insulator 13 is arranged so as to surround the stator coil end portion 12 in the same manner as in the first embodiment. The insulator 13 includes the radially outer protruding portion 133 on the radially outer side, the radially inner protruding portion 132 on the radially inner side, and the base portion 131 between the stator coil end portion 12 and the stator coil 1. The radially outer protruding portion 133 is longer than the radially inner protruding portion 132. The radially inner protruding portion 132 has the first through-hole 101 for guiding the flying cooling oil 104 into the stator coil end portion 12.

The radially outer protruding portion 133 and the radially inner protruding portion 132 are connected to each other through intermediation of the base portion 131. Unlike the first embodiment, in the eighth embodiment, the insulator 13 further includes an outer base portion 135 formed in an end portion positioned on an opposite side from the connection side of the radially outer protruding portion 133 with respect to the base portion 131. The outer base portion 135 is connected to the radially outer protruding portion 133 and the radially inner protruding portion 132. The outer base portion 135 is configured to prevent the cooling oil 104 having passed through the first through-hole 101 to infiltrate the region between the radially inner protruding portion 132 and the radially outer protruding portion 133 from flying to an outside of the insulator 13.

With the above-mentioned configuration, the cooling oil 104 flying from the rotor 8 passes through the first through-hole 101 to collide with the surface of the stator coil end portion 12. The cooling oil 104 having collided with the surface of the stator coil end portion 12 flows from the radially inner side to the radially outer side along an end surface of the stator coil end portion 12 to collide with the radially outer protruding portion 133 of the insulator 13. The cooling oil 104 having collided with the radially outer protruding portion 133 flows from the stator coil end portion 12 to the outer base portion 135 along the radially outer protruding portion 133, and further flows from the radially outer side to the radially inner side along the outer base portion 135 to be brought close to the stator coil end portion 12. Further, the cooling oil 104 flying from the rotor 8 passes through the first through-hole 101 to collide with the surface of the outer base portion 135. The cooling oil 104 having collided with the surface of the outer base portion 135 flows from the radially inner side to the radially outer side along the surface of the outer base portion 135, to thereby collide with the radially outer protruding portion 133 of the insulator 13. The cooling oil 104 having collided with the radially outer protruding portion 133 flows from the outer base portion 135 to the stator coil end portion 12 along the radially outer protruding portion 133, and further flows from the radially outer side to the radially inner side along the stator coil end portion 12. Therefore, a space surrounded by the stator coil end portion 12, the radially outer producing portion 133, and the outer base portion 135 serves as a retaining portion 108 configured to retain the cooling oil 104 having passed through the first through-hole 101. The cooling oil 104 retained in the retaining portion 108 is more easily brought into contact with the stator coil end portion 12 that is a heat generating part. Thus, in the rotary electric machine according to the eighth embodiment, the contact time between the cooling oil 104 and the stator coil end portion 12 increases, and the effect of cooling the stator coil end portion 12 is enhanced.

As illustrated in FIG. 28, the rotary electric machine according to the eighth embodiment includes a plurality of units each including the stator coil end portion 12 and the insulator 13 having the above-mentioned configurations. The plurality of units are arranged side by side in the circumferential direction on one surface of the stator core 1. Therefore, the stator coil end portion 12 and the insulator 13 illustrated in FIG. 24 and FIG. 25 positioned on the upper side from the rotor 8 have a vertically reversed relationship with the stator coil end portion 12 and the insulator 13 illustrated in FIG. 26 and FIG. 27 positioned on the lower side from the rotor 8.

The units adjacent to each other in the circumferential direction are arranged so that the retaining portions 108 of the insulators 13 communicate to each other in order to accelerate the movement of the cooling oil 104 in the circumferential direction. With the structure illustrated in FIG. 28, in the stator 40 of the rotary electric machine, the insulators 13 are arranged continuously in the circumferential direction, and hence the retaining portions 108 are continuously arranged from the upper end to the lower end of the rotary electric machine. Through continuous arrangement of the retaining portions 108 from the upper end to the lower end of the rotary electric machine, the refrigerant passage 109 is formed in the rotary electric machine. The respective radially outer protruding portions 133 of the adjacent insulators 13 are joined to each other. The respective radially inner protruding portions 132 of the adjacent insulators 13 are joined to each other on the upper end side of the rotary electric machine, but are not joined to each other on the lower end side of the rotary electric machine.

With the above-mentioned configuration, on the upper end side of the rotary electric machine, only the first-through hole 101 serves as an inlet and an outlet for the cooling oil 104 flying from the rotor 8 to each of the stator coil end portions 12 of the stator 40. The cooling oil 104, which passes through the first through-hole 101, and flows into the stator coil end portion 12 from the radially inner side to the radially outer side, is retained in the retaining portion 108. The cooling oil 104 retained in the retaining portion 108 is easily held in the retaining portion 108, and the contact time and contact area of the cooling oil 104 with respect to the stator coil end portion 12 increase. With this, the cooling of the stator coil end portion 12 is accelerated.

The cooling oil 104 having been used for cooling the stator coil end portion 12 flows through the refrigerant passage 109 in the gravity direction from the upper end to the lower end of the rotary electric machine in the direction indicated by the arrow A and is retained in the lower end of the rotary electric machine. On the lower end side of the rotary electric machine, the adjacent radially inner protruding portions 132 are not joined to each other, and hence a gap is formed between the adjacent radially inner protruding portions 132. Therefore, the cooling oil 104 heated by passing through the refrigerant passage 109 in the gravity direction from the upper end of the rotary electric machine flows to drop from the upper end of the rotary electric machine and is discharged from the gap between the adjacent radially inner protruding portions 132. With this, the cold cooling oil 104 flying from the rotor 8 passes through the first-through hole 101 to be guided to the stator coil end portion 12 from the radially inner side to the radially outer side. Thus, the outer base portion 135 can cause the contact time between the cooling oil 104 and the stator coil end portion 12 to increase and accelerates the discharge of the heated cooling oil 104 by cooling. Further, the cooling oil 104 equally flies in the circumferential direction, and hence the stator 40 including the stator coil end portions 12 can be equally cooled in the circumferential direction.

As described above, in the rotary electric machine according to the eighth embodiment of the present invention, the insulator 13 includes the outer base portion 135, which is formed on the radially outer protruding portion 133, and extends to the radially inner protruding portion 132. Therefore, the cooling oil 104 having passed through the first through-hole 101 to infiltrate the region between the radially inner protruding portion 132 and the radially outer protruding portion 133 can be prevented from flying to an outside of the insulator 13.

In the eighth embodiment, description is given of the configuration in which the cooling oil 104 from the rotor 8 is caused to collide with the stator coil end portion 12 through the first through-hole 101 formed in the insulator 13. However, the present invention is not limited to this structure and may have various structures.

Further, description is given of each of the embodiments of the present invention. However, examples are merely illustrated in the drawings, and the present invention may have various modes.

Further, in each of the above-mentioned embodiments, there is illustrated the example in which each of the first through-hole 101, the second through-hole 102, and the third through-hole 103 has a rectangular shape in cross section. However, each of the through-holes may be a round through-hole 201 having a cylindrical shape in cross section, a rectangular through-hole 202 having a polygonal shape in cross section, a triangular through-hole 203, a trapezoidal through-hole 204 or a star-shaped through-hole 205, or a cutout through-hole 206 having a cutout shape in cross section, as illustrated in FIG. 29 to FIG. 34. Further, as each of the through-holes, the round through-hole 201, the rectangular through-hole 202, the triangular through-hole 203, the trapezoidal through-hole 204, and the star-shaped through-hole 205 may be variously combined.

REFERENCE SIGNS LIST

1 stator core, 2 frame, 3 center frame, 4 load-side bearing, 5 front frame, 6 non-load-side bearing, 7 rear frame, 8 rotor, 9 bus bar, 10 bus bar holder, 11 stator coil, 12 stator coil end portion, 13 insulator, 14 shaft, 15 through-hole, 16 magnet accommodating hole, 17 rotor core, 18 permanent magnet, 19 load-side end plate, 20 non-load-side end plate, 21 oil path plate, 22 ring, 23 first shaft oil path, 24 second shaft oil path, 25 pump, 26 inlet, 27 first oil path, 28 coil jetting hole, 29 bearing jetting hole, 30 cover, 31 cooling oil introducing portion, 32 cooling oil storing portion, 33 second oil path, 34 shaft jetting hole, 35 through-hole, 36 rear cover, 37 third oil path, 38 level difference, 39 small hole, 40 stator, 101 first through-hole, 102 second through-hole, 103 third through-hole, 104 cooling oil, 105 first cooling groove, 106 second cooling groove, 107 third cooling groove, 108 retaining portion, 109 refrigerant passage, 131 base portion, 132 radially inner protruding portion, 133 radially outer protruding portion, 134 shielding plate, 135 outer base portion, 301 oil path, 302 oil path, 303 oil path, 304 oil path, 305 oil path

The invention claimed is:

1. A rotary electric machine, comprising:
   a rotor including a shaft and a rotor core provided on the shaft; and a stator including a stator core provided on a radially outer side from the rotor, an insulator provided on an axially outer side from the stator core, and a stator coil end portion formed on the insulator, the rotor being configured to rotate about the shaft, the rotary electric machine comprising a first refrigerant passage through which refrigerant passes from the shaft to the rotor core, wherein the rotor core includes a second refrigerant passage through which the refrigerant having passed through the first refrigerant passage passes, wherein the insulator includes:

a base portion opposed to an axial end portion of the stator core;

a radially inner protruding portion, which is formed on a radially inner side of the base portion, and extends from the base portion in a direction of separating from the stator core in an axial direction; and a radially outer protruding portion, which is formed on a radially outer side of the base portion, and extends from the base portion in the direction of separating from the stator core in the axial direction, wherein the stator coil end portion is provided on an opposite side of the base portion from the stator core in the axial direction, and is provided between the radially inner protruding portion and the radially outer protruding portion in a radial direction, wherein the radially inner protruding portion has a first through-hole penetrating therethrough in the radial direction, wherein the refrigerant having passed through the second refrigerant passage passes through the first through-hole to travel to the stator coil end portion, wherein the insulator has a through-hole penetrating therethrough separately from the first through hole so as to penetrate the insulator to connect the side where the stator coil end portion is installed and the stator core side, wherein a length in the radial direction of the through-hole that penetrates the insulator is smaller than a distance between the radially inner protruding portion and the radially outer protruding portion.

2. The rotary electric machine according to claim 1, wherein, when the rotor is rotated, the refrigerant having passed through the second refrigerant passage passes through the first through-hole to reach the stator coil end portion.

3. The rotary electric machine according to claim 1, wherein as the through-hole penetrating the insulator, the base portion has a second through-hole extending in the axial direction.

4. The rotary electric machine according to claim 3, wherein the radially outer protruding portion has a third through-hole through which the refrigerant having passed by the stator coil end portion passes to travel to the stator core, wherein the stator core has a cooling groove that communicates to the third through-hole, wherein the cooling groove extends from a portion communicating to the third through-hole in the stator core to a portion on a radially inner side from the radially inner protruding portion, and wherein the cooling groove communicates to the second through-hole.

5. The rotary electric machine according to claim 3, wherein the second through-hole has a cylindrical shape, a polygonal shape, or a cutout shape in cross section.

6. The rotary electric machine according to claim 1, wherein as the through-hole penetrating the insulator, the radially outer protruding portion has a third through-hole through which the refrigerant having passed by the stator coil end portion passes to travel to the stator core.

7. The rotary electric machine according to claim 6, wherein the stator core has a cooling groove that communicates to the third through-hole.

8. The rotary electric machine according to claim 6, wherein the stator core has a cooling groove that communicates to the third through-hole, and wherein the cooling groove extends from a portion communicating to the third through-hole in the stator core to a portion on a radially inner side from the radially inner protruding portion.

9. The rotary electric machine according to claim 6, wherein the third through-hole has a cylindrical shape, a polygonal shape, or a cutout shape in cross section.

10. The rotary electric machine according to claim 1, wherein the insulator further includes a shielding plate, which is formed on the radially outer protruding portion, and extends from the radially outer protruding portion to the radially inner side so as to be brought close to the stator coil end portion.

11. The rotary electric machine according to claim 1, wherein the insulator further includes an outer base portion, which is formed on the radially outer protruding portion, and extends to the radially inner protruding portion.

12. The rotary electric machine according to claim 1, wherein the first through-hole has a cylindrical shape, a polygonal shape, or a cutout shape in cross section.

* * * * *